US007140534B2

(12) United States Patent
Miyazawa et al.

(10) Patent No.: US 7,140,534 B2
(45) Date of Patent: Nov. 28, 2006

(54) DATA RECORDING MEDIUM, READING DEVICE, RECORDING DEVICE, AND METHODS THEREOF

(75) Inventors: Toshio Miyazawa, Kanagawa (JP); Hideaki Yamagata, Kanagawa (JP); Hiroshi Shimura, Kanagawa (JP); Michiyoshi Tachikawa, Kanagawa (JP); Hiroaki Nagatsuka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 10/463,599

(22) Filed: Jun. 18, 2003

(65) Prior Publication Data

US 2004/0035934 A1 Feb. 26, 2004

(30) Foreign Application Priority Data

Jun. 24, 2002 (JP) ............................ 2002-182850
Aug. 9, 2002 (JP) ............................ 2002-232513
Sep. 20, 2002 (JP) ............................ 2002-274659
Feb. 27, 2003 (JP) ............................ 2003-050305

(51) Int. Cl.
*G06F 17/00* (2006.01)

(52) U.S. Cl. .................................... 235/375; 705/57 G

(58) Field of Classification Search ................ 235/375, 235/492, 382, 380, 494; 355/25, 208, 308; 705/57, 405
See application file for complete search history.

(56) References Cited

U.S. PATENT DOCUMENTS 4,979,210 A * 12/1990 Nagata et al. ................ 705/57
5,027,398 A * 6/1991 Miyoshi ...................... 705/57
5,073,925 A * 12/1991 Nagata et al. ................ 705/57
5,424,807 A * 6/1995 Ohmura ....................... 705/57
5,444,518 A 8/1995 Hashiguchi et al.
5,473,106 A * 12/1995 Miyashita et al. ............ 84/609
5,598,160 A 1/1997 Matsushima
5,652,803 A 7/1997 Tachikawa et al.
5,659,628 A 8/1997 Tachikawa et al.
5,682,227 A * 10/1997 Taguchi et al. ............... 355/25
5,751,854 A 5/1998 Saitoh et al.
5,757,957 A 5/1998 Tachikawa
5,842,023 A * 11/1998 Tsumura ..................... 717/170
5,870,467 A * 2/1999 Imai et al. .................... 705/57
5,917,619 A * 6/1999 Yamagata et al. ............ 705/57
5,920,658 A 7/1999 Yamagata et al.
6,018,593 A 1/2000 Yamagata (Continued)

FOREIGN PATENT DOCUMENTS

JP 7-264398 10/1995

(Continued)

*Primary Examiner*—Uyen-Chau N. Le
(74) *Attorney, Agent, or Firm*—Dickstein Shapiro LLP

(57) ABSTRACT

There are provided a data recording medium, a reading device for reading the data recording medium, a recording device for reading the data recording medium and recording data to other media, and methods thereof able to prevent forgery without comparing visible information and data stored in a built-in electronic circuit chip. The reading device is for reading a data recording medium including a sheet portion visibly printed with an image and a data storage unit recorded with control data. The reading device comprises a first reading unit adapted to optically read the image on the sheet portion, a second reading unit adapted to read the control data including read permission data indicating whether reading of the image is permitted, a determination unit adapted to determine whether reading of the image by the first reading unit is permitted based on the read permission data obtained by the second reading unit, and a controller adapted to control the first reading unit based on the determination by the determination unit.

10 Claims, 27 Drawing Sheets

U.S. PATENT DOCUMENTS 6,021,222 A 2/2000 Yamagata
6,025,603 A 2/2000 Hasegawa et al.
6,064,773 A 5/2000 Yamagata
6,070,799 A * 6/2000 Ashe .................... 235/462.01
6,081,897 A * 6/2000 Bersson ...................... 713/200
6,109,526 A * 8/2000 Ohanian et al. ....... 235/462.45
6,115,495 A 9/2000 Tachikawa et al.
6,116,510 A * 9/2000 Nishino ...................... 235/494
6,181,820 B1 1/2001 Tachikawa et al.
6,226,417 B1 5/2001 Yamagata et al.
6,256,412 B1 7/2001 Miyazawa et al.
6,272,248 B1 8/2001 Saitoh et al.
6,321,981 B1 * 11/2001 Ray et al. .................. 235/380
6,527,173 B1 * 3/2003 Narusawa et al. .......... 235/380
6,600,571 B1 * 7/2003 Ito ............................ 358/1.15
6,633,723 B1 * 10/2003 Kuroda et al. ................ 386/94
6,771,914 B1 * 8/2004 Takamine et al. ............. 399/82
6,827,279 B1 * 12/2004 Teraura ...................... 235/492
2001/0041055 A1 * 11/2001 Kawamura et al. ........... 386/95
2001/0047481 A1 * 11/2001 Inoha et al. .................. 705/57
2002/0006223 A1 1/2002 Yamagata et al.
2002/0146174 A1 10/2002 Shimura

FOREIGN PATENT DOCUMENTS

JP 7-274027 10/1995
WO WO 95/13597 5/1995
WO WO-00/34923 6/2000
WO WO 02/02350 A1 1/2002

* cited by examiner

DATA RECORDING MEDIUM, READING DEVICE, RECORDING DEVICE, AND METHODS THEREOF

BACKGROUND OF THE INVENTION

1. Field of the Invention

The present invention relates to a data recording medium, a reading device for reading the data recording medium, a recording device for reading the data recording medium and recording data to another medium, and methods thereof for preventing forgery of paper money or securities.

2. Description of the Related Art

In the related art, for example, the international patent publication WO 00/34923 discloses a method for preventing forgery of sheet-like paper money or securities by using built-in electronic circuits. In this method, an electronic chip is put in a sheet-like bill or securities document, and the visible information printed on the bill or securities document is encrypted and stored in the chip. When using the bill or security, a forgery can be found by comparing the visible information and the data stored in the chip, therefore preventing forgery. This method has been attracting attention as an effective way of preventing forgery of paper money or securities. This method was reported by the Nippon Keizai Shimbun (Evening Edition, May 24, 2002). According to this method, by storing different numbers in the built-in chips of different bills, it is possible to immediately identify bills that do not have such built-in chips or those having false numbers printed thereon.

Further, because this method makes it possible to pursue the distribution channels of the bills used in crime-related transactions, and to prevent money laundering, efforts are being made to put it into practical use.

However, in the above forgery prevention method, one has to compare the visible information printed on the bill or securities document and the data stored in the built-in electronic circuit chip. Usually, the visible information is obtained by scanning the bill or securities document with a scanner, so depending on performance of the scanner, the accuracy of reading the image of the visible information on the bill or securities document changes greatly, consequently, it becomes difficult to confirm whether the visible information is identical to the data stored in the electronic circuit chip.

SUMMARY OF THE INVENTION

It is a general object of the present invention to provide a way to solve the above problem of the related art.

A more specific object of the present invention is to provide a data recording medium, a reading device for reading the data recording medium, a recording device for reading the data recording medium and recording data to another medium, and methods thereof able to prevent forgery without comparing visible information and data stored in a built-in electronic circuit chip.

To attain the above object, according to a first aspect of the present invention, there is provided a reading device for reading a data recording medium including a sheet portion visibly printed with an image and a data storage unit recorded with control data, comprising a first reading unit adapted to optically read the image on the sheet portion, a second reading unit adapted to read the control data including read permission data indicating whether reading of the image by the first reading unit is permitted, a determination unit adapted to determine whether reading of the image by the first reading unit is permitted based on the read permission data obtained by the second reading unit, and a controller adapted to control the first reading unit based on the determination by the determination unit.

Preferably, the controller directs the first reading unit to stop reading the image when the determination unit determines that reading of the image by the first reading unit is not permitted, and the controller directs the first reading unit to read the image when the determination unit determines that reading of the image by the first reading unit is permitted.

According to the above invention, when the first reading unit reads the image recorded on the sheet portion of the data recording medium, based on the determination by the determination unit, it is possible to control the read operation of the first reading unit, and thereby preventing forgery of the data recording medium. Specifically, when the determination unit determines that reading of the image by the first reading unit is not permitted, the read operation of the first reading unit can be stopped, thus forgery is preventable.

Preferably, the above reading device further comprises a moving unit configured to move the second reading unit at least within a range covered by the data recording medium.

The above reading device further comprises a moving unit configured to move the first reading unit at least within a range covered by the data recording medium, wherein the second reading unit is attached to the first reading unit, and the first reading unit reads the image from the data recording medium while the second reading unit reads the control data from the data recording medium.

The above reading device further comprises a transporting unit configured to transport the data recording medium to a predetermined reading position and transport the data recording medium away from the predetermined reading position after the first reading unit completes reading the image, wherein the second reading unit is provided in a path of the transportation unit when the transportation unit transports the data recording medium.

According to the above invention, by making the second reading unit movable, it is not necessary to mount the second reading unit to cover the whole range of the data recording medium; this allows reading the control data with a lesser number of the second reading units and therefore lowering cost. Further, it is possible to reduce the amount of electromagnetic waves, therefore reduce adverse influences on the human body.

To attain the above object, according to a second aspect of the present invention, there is provided a recording device adapted to read data from a data recording medium and record the data to a target medium, said data recording medium including a sheet portion visibly printed with an image and a data storage unit recorded with control data, the recording device comprising a first reading unit adapted to optically read the image on the sheet portion, a recording unit adapted to record the image obtained by the first reading unit to the target medium, a writing unit adapted to write the control data to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium and the writing unit to write the control data to the target medium when the determination unit determines that recording of the image and writing of the control data are permitted, and the controller directs the recording unit not to record the image to the target medium and the writing unit not to write the control data to the target medium when the determination unit determines that recording of the image and writing of the control data are not permitted.

According to the above aspect of the invention, since it is possible to control operations of the recording unit and the writing unit based on the determination by the determination unit, forgery of the data recording medium is preventable.

To attain the above object, according to a third aspect of the present invention, there is provided a recording device adapted to read data from a data recording medium and record the data to a target medium, said data recording medium including a sheet portion visibly printed with an image and a data storage unit recorded with control data, the recording device comprising a first reading unit adapted to optically read the image on the sheet portion, a recording unit adapted to record one of the image obtained by the first reading unit and predetermined data to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit based on the determination by the determination unit, wherein the controller directs the recording unit to record the predetermined data to the target medium when the determination unit determines that recording of the image is not permitted, and the controller directs the recording unit to record the image to the target medium when the determination unit determines that recording of the image is permitted.

According to the above aspect of the invention, when the recording unit tries to record the image to another medium (a target medium) but recording of the image is not permitted, predetermined data, such as a warning message, or any other data different from the image, are recorded to the target medium. Thereby, forgery of the data recording medium is preventable.

To attain the above object, according to a fourth aspect of the present invention, there is provided a recording device adapted to read data from a data recording medium and record the data to a target medium, said data recording medium including a sheet portion visibly printed with an image and a data storage unit recorded with control data, the recording device comprising a first reading unit adapted to optically read the image on the sheet portion, a recording unit adapted to record the image obtained by the first reading unit to the target medium, a writing unit adapted to write user identification information for identifying users of the recording device to the data storage unit, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium when the determination unit determines that recording of the image is permitted, and the controller directs the writing unit to write the user identification information to the data storage unit when the determination unit determines that recording of the image is not permitted.

According to the above aspect of the invention, when recording of the image is not permitted, user identification information is written to the data recording medium, and this information can be used as evidence for using the data recording medium. This enables prevention of forgery of the data recording medium and a later follow-up survey as well.

To attain the above object, according to a fifth aspect of the present invention, there is provided a recording device adapted to read data from a data recording medium and record the data to a target medium, said data recording medium including a sheet portion visibly printed with an image and a data storage unit recorded with control data, the recording device comprising a first reading unit adapted to optically read the image on the sheet portion, a recording unit adapted to record the image obtained by the first reading unit to the target medium, a writing unit adapted to write user identification information for identifying users of the recording device to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium when the determination unit determines that recording of the image is permitted, and the controller directs the writing unit to write the user identification information to the target medium when the determination unit determines that recording of the image is not permitted.

According to the above aspect of the invention, when recording of the image is not permitted, user identification information can be written on the target medium, and this information can be used as evidence for using the data recording medium. This enables prevention of forgery of the data recording medium and a later follow-up survey as well.

Preferably, the above recording device further comprises a moving unit configured to move the second reading unit at least within a range covered by the data recording medium.

Furthermore, the above recording device further comprises a moving unit configured to move the first reading unit at least within a range covered by the data recording medium, wherein the second reading unit is attached to the first reading unit, and the first reading unit reads the image from the data recording medium while the second reading unit reads the control data from the data recording medium.

Furthermore, the above recording device further comprises a transporting unit configured to transport the data recording medium to a predetermined reading position and transport the data recording medium away from the predetermined reading position after the first reading unit completes reading the image, wherein the second reading unit is provided in a path of the transportation unit when the transportation unit transports the data recording medium.

To attain the above object, according to a sixth aspect of the present invention, there is provided a duplicating apparatus adapted to read data from a data recording medium and record the data to a target medium, said data recording medium including a sheet portion visibly printed with an image and a data storage unit recorded with control data, the duplicating device comprising a first reading unit adapted to optically read the image on the sheet portion, a recording unit adapted to record the image obtained by the first reading unit to the target medium, a writing unit adapted to write the control data to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium and the writing unit to write the control data to the target medium when the determination unit determines that recording of the image and writing of the control data are permitted, and the controller directs the recording unit not to record the image to the target medium and the writing unit not to write the control data to the target medium when the determination unit determines that recording of the image and writing of the control data are not permitted.

According to the above aspect of the invention, since it is possible to control the operations of the recording unit and the writing unit based on the determination by the determination unit, forgery of the data recording medium is preventable.

Preferably, the above duplicating apparatus further comprises a moving unit configured to move the second reading unit at least within a range covered by the data recording medium.

The above duplicating apparatus further comprises a moving unit configured to move the first reading unit at least within a range covered by the data recording medium, wherein the second reading unit is attached to the first reading unit, and the first reading unit reads the image from the data recording medium while the second reading unit reads the control data from the data recording medium.

The above duplicating apparatus further comprises a transporting unit configured to transport the data recording medium to a predetermined reading position and transport the data recording medium away from the predetermined reading position after the first reading unit completes reading the image, wherein the second reading unit is provided in a path of the transportation unit when the transportation unit transports the data recording medium.

To attain the above object, according to a seventh aspect of the present invention, there is provided a duplicating apparatus adapted to read data from a data recording medium and record the data to a target medium, said data recording medium including a sheet portion visibly printed with an image and a data storage unit recorded with control data, the duplicating device comprising a first reading unit adapted to optically read the image on the sheet portion, a recording unit adapted to record one of the image obtained by the first reading unit and predetermined data to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit based on the determination by the determination unit, wherein the controller directs the recording unit to record the predetermined data to the target medium when the determination unit determines that recording of the image is not permitted, and the controller directs the recording unit to record the image to the target medium when the determination unit determines that recording of the image is permitted.

According to the above aspect of the invention, when the recording unit tries to record the image to another medium (a target medium) but recording of the image is not permitted, a warning message or other data different from the image are recorded to the target medium. Thereby, forgery of the data recording medium is preventable.

To attain the above object, according to an eighth aspect of the present invention, there is provided a duplicating apparatus adapted to read data from a data recording medium and record the data to a target medium, said data recording medium including a sheet portion visibly printed with an image and a data storage unit recorded with control data, the duplicating device comprising a first reading unit adapted to optically read the image on the sheet portion, a recording unit adapted to record the image obtained by the first reading unit to the target medium, a writing unit adapted to write user identification information for identifying users of the duplicating apparatus to the data storage unit, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium when the determination unit determines that recording of the image is permitted, and the controller directs the writing unit to write the user identification information to the data storage unit when the determination unit determines that recording of the image is not permitted.

According to the above aspect of the invention, when recording of the image is not permitted, user identification information can be written on the data recording medium, and this information can be used as evidence for using the data recording medium. This enables prevention of forgery of the data recording medium and a later follow-up survey as well.

To attain the above object, according to a ninth aspect of the present invention, there is provided a duplicating apparatus adapted to read data from a data recording medium and record the data to a target medium, said data recording medium including a sheet portion visibly printed with an image and a data storage unit recorded with control data, the duplicating device comprising a first reading unit adapted to optically read the image on the sheet portion, a recording unit adapted to record the image obtained by the first reading unit to the target medium, a writing unit adapted to write user identification information for identifying users of the duplicating apparatus to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium when the determination unit determines that recording of the image is permitted, and the controller directs the writing unit to write the user identification information to the target medium when the determination unit determines that recording of the image is not permitted.

According to the above aspect of the invention, when recording of the image is not permitted, user identification information can be written on a target medium, and this information can be used as evidence for using the data recording medium. This enables prevention of forgery of the data recording medium and a later follow-up survey as well.

To attain the above object, according to a 10th aspect of the present invention, there is provided a method of reading a data recording medium including a sheet portion visibly printed with an image and a data storage unit recorded with control data, comprising a first step of reading the control data including reading permission data indicating whether reading of the image is permitted, a second step of determining whether reading of the image is permitted based on the reading permission data obtained in the first step, and a third step of controlling operation of reading the image based on the determination made in the second step.

Preferably, in the third step, the operation of reading the image is stopped when reading of the image is not permitted, and the operation of reading the image is carried out when reading of the image is permitted.

According to the above aspect of the invention, when reading the image recorded on the sheet portion of the data recording medium, based on the determination made in the determination step, it is possible to control the operation of reading the image, and thereby preventing forgery of the data recording medium. Specifically, when it is determined that reading of the image is not permitted, the operation of reading of the image, and thus forgery is preventable.

To attain the above object, according to a 11th aspect of the present invention, there is provided a method of reading data from a data recording medium and recording the data to a target medium, the data recording medium including a sheet portion visibly printed with an image and a data storage unit recorded with control data, the method comprising a first step of reading the image, a second step of reading the control data including recording permission data indicating whether recording of the image is permitted, a third step of determining whether recording of the image is permitted based on the recording permission data obtained in the second step, and a fourth step of carrying out one of recording predetermined data to the target medium when recording of the image is not permitted as determined in the third step and recording the image to the target medium when recording of the image is permitted as determined in the third step.

According to the above aspect of the invention, when recording the image to another medium (a target medium) but recording of the image is not permitted, a warning message or other data different from the image are recorded to the target medium. Thereby, forgery of the data recording medium is preventable.

To attain the above object, according to a 12th aspect of the present invention, there is provided a method of reading data from a data recording medium and recording the data to a target medium, the data recording medium including a sheet portion visibly printed with an image and a data storage unit recorded with control data, the method comprising a first step of reading the image, a second step of reading the control data including recording permission data indicating whether recording of the image is permitted, a third step of determining whether recording of the image is permitted based on the recording permission data obtained in the second step, and a fourth step of carrying out one of writing user identification data for identifying users of the data recording medium to the data storage unit when recording of the image is not permitted as determined in the third step, and recording the image to the target medium when recording of the image is permitted as determined in the third step.

According to the above aspect of the invention, when recording of the image is not permitted, user identification information is written on the data recording medium, and this information can be used as evidence for using the data recording medium. This enables prevention of forgery of the data recording medium and a later follow-up survey as well.

To attain the above object, according to a 13th aspect of the present invention, there is provided a method of reading data from a data recording medium and recording the data to a target medium, the data recording medium including a sheet portion visibly printed with an image and a data storage unit recorded with control data, the method comprising a first step of reading the image, a second step of reading the control data including recording permission data indicating whether recording of the image is permitted, a third step of determining whether recording of the image is permitted based on the recording permission data obtained in the second step, and a fourth step of carrying out one of writing user identification data for identifying users of the data recording medium to the target medium when recording of the image is not permitted as determined in the third step, and recording the image to the target medium when recording of the image is permitted as determined in the third step.

According to the above aspect of the invention, when recording of the image is not permitted, user identification information is written on a target medium, and this information can be used as evidence for using the data recording medium. This enables prevention of forgery of the data recording medium and a later follow-up survey as well.

To attain the above object, according to a 14th aspect of the present invention, there is provided a data recording medium, comprising a sheet portion visibly printed with an image, and a data storage unit recorded with control data, wherein the control data includes reading permission data indicating whether reading of the image by the first reading unit is permitted.

To attain the above object, according to a 15th aspect of the present invention, there is provided a program executed by a computer for reading a data recording medium including a sheet portion visibly printed with an image and a data storage unit recorded with control data, comprising a first step of reading the control data including reading permission data indicating whether reading of the image by the first reading unit is permitted, a second step of determining whether reading of the image is permitted based on the reading permission data obtained in the first step, and a third step of controlling operation of reading the image based on the determination made in the second step.

To attain the above object, according to a 16th aspect of the present invention, there is provided a storage medium that stores a program executed by a computer for reading a data recording medium including a sheet portion visibly printed with an image and a data storage unit recorded with control data, the program comprising a first step of reading the control data including reading permission data indicating whether reading of the image is permitted, a second step of determining whether reading of the image is permitted based on the reading permission data obtained in the first step, and a third step of controlling operation of reading the image based on the determination made in the second step.

To attain the above object, according to a 17th aspect of the present invention, there is provided a recording device adapted to read data from a data recording medium and record the data to a target medium, said data recording medium including a sheet portion visibly printed with an image and a data storage unit recorded with control data, the recording device comprising a first reading unit adapted to optically read the image on the sheet portion, a reading information acquiring unit adapted to acquire reading condition data of the operation of reading the image, a writing unit adapted to write the reading condition data acquired by the reading information acquiring unit to the data storage unit, a recording unit adapted to record the image obtained by the first reading unit to the target medium, a second reading unit adapted to read the control data including recording permission data indicating whether recording of the image is permitted, a determination unit adapted to determine whether recording of the image is permitted based on the recording permission data obtained by the second reading unit, and a controller adapted to control the recording unit and the writing unit based on the determination by the determination unit, wherein the controller directs the recording unit to record the image to the target medium when the determination unit determines that recording of the image is permitted, and the controller directs the writing unit to write the reading condition data to the data storage unit when the determination unit determines that recording of the image is not permitted.

Preferably, the reading condition data includes data of date and time when the image is read, or device identification data for identifying the recording device, or user identification data for identifying users of the recording device, or position data of the recording device.

According to the above aspect of the invention, when recording of the image is not permitted, reading condition data, such as date and time of the read operation, device identification data of the recording device, user identification data, and position data of the recording device, are written to the data storage unit. This enables prevention of forgery of the data recording medium and a later follow-up survey as well.

To attain the above object, according to a 18th aspect of the present invention, there is provided a reading device adapted to read a data recording medium including a sheet portion visibly printed with an image and a data storage unit recorded with control data, comprising a first reading unit adapted to optically read the image on the sheet portion, a second reading unit adapted to read the control data, a determination unit adapted to determine whether predetermined data are included in the control data obtained by the second reading unit, a transmission unit adapted to transmit the control data to a device outside, and a controller adapted to control the transmission unit based on the determination by the determination unit, wherein the controller directs the transmission unit to transmit the control data to the device outside when the determination unit determines that the predetermined data is included in the control data.

According to the above aspect of the invention, data transmission to other devices is enabled, making it possible to inform others when forgery of the data recording medium is found.

To attain the above object, according to a 19th aspect of the present invention, there is provided a reading device adapted to read a data recording medium including a sheet portion visibly printed with an image and a data storage unit recorded with control data, comprising a first reading unit adapted to optically read the image on the sheet portion, a reading information acquiring unit adapted to acquire reading condition data of the operation of reading the image, a writing unit adapted to write the reading condition data acquired by the reading information acquiring unit to the data storage unit, a second reading unit adapted to read the control data, a first determination unit adapted to determine whether predetermined data are included in the control data obtained by the second reading unit, a transmission unit adapted to transmit the control data and the reading condition data to a device outside, a second determination unit adapted to determine whether transmission of the control data and the reading condition data is possible, and a controller adapted to control the transmission unit and the writing unit based on the determination by the first determination unit and the second determination unit, wherein the controller directs the transmission unit to transmit the control data and the reading condition data to the device outside when the second determination unit determines that transmission of the control data and the reading condition data is possible, and the controller directs the writing unit to write the reading condition data to the data storage unit when the second determination unit determines that transmission of the control data and the reading condition data is not possible.

To attain the above object, according to a 20th aspect of the present invention, there is provided an image forming apparatus adapted to read an image from a data recording medium and form the image on a target medium, said data recording medium including a sheet portion visibly printed with the image and a data storage unit recorded with control data, the image forming apparatus comprising a first reading unit adapted to optically read the image on the sheet portion, a reading information acquiring unit adapted to acquire reading condition data of the operation of reading the image, a writing unit adapted to write the reading condition data acquired by the reading information acquiring unit to the data storage unit, a recording unit adapted to record the image obtained by the first reading unit to the target medium, a second reading unit adapted to read the control data including recording permission data indicating whether recording of the image by the recording unit is permitted, a determination unit adapted to determine whether recording of the image by the recording unit is permitted based on the recording permission data obtained by the second reading unit, and a controller adapted to control the recording unit and the writing unit based on the determination by the determination unit, wherein the controller directs the recording unit to record the image to the target medium when the determination unit determines that recording of the image by the recording unit is permitted, and the controller directs the writing unit to write the reading condition data to the data storage unit when the determination unit determines that recording of the image is not permitted.

To attain the above object, according to a 21st aspect of the present invention, there is provided an image forming apparatus adapted to read a data recording medium including a sheet portion visibly printed with an image and a data storage unit recorded with control data, the image forming apparatus comprising a first reading unit adapted to optically read the image on the sheet portion, a second reading unit adapted to read the control data, a determination unit adapted to determine whether predetermined data are included in the control data obtained by the second reading unit, a transmission unit adapted to transmit the control data to a device outside, and a controller adapted to control the transmission unit based on the determination by the determination unit, wherein the controller directs the transmission unit to transmit the control data to the device outside when the determination unit determines that the predetermined data are included in the control data.

To attain the above object, according to a 22nd aspect of the present invention, there is provided an image forming apparatus adapted to read a data recording medium including a sheet portion visibly printed with an image and a data storage unit recorded with control data, the image forming apparatus comprising a first reading unit adapted to optically read the image on the sheet portion, a reading information acquiring unit adapted to acquire reading condition data of the operation of reading the image, a writing unit adapted to write the reading condition data acquired by the reading information acquiring unit to the data storage unit, a second reading unit adapted to read the control data, a first determination unit adapted to determine whether predetermined data are included in the control data obtained by the second reading unit, a transmission unit adapted to transmit the control data and the reading condition data to a device outside, a second determination unit adapted to determine whether transmission of the control data and the reading condition data is possible, and a controller adapted to control the transmission unit and the writing unit based on the determination by the first determination unit and the second determination unit, wherein the controller directs the transmission unit to transmit the control data and the reading condition data to the device outside when the second determination unit determines that transmission of the control data and the reading condition data is possible, and the controller directs the writing unit to write the reading condition data to the data storage unit when the second determination unit determines that transmission of the control data and the reading condition data is not possible.

To attain the above object, according to a 23rd aspect of the present invention, there is provided an image forming apparatus adapted to read image from a page of a book, a data storage unit being attached to the book and recorded with control data, the image forming apparatus comprising a first reading unit adapted to optically read the image on the page, a second reading unit adapted to read the control data including first reading condition data indicating the number of times the reading operations have already been performed with the book and second reading condition data indicating a limiting number of times of reading operations with the book, a determination unit adapted to determine whether the first reading condition data are greater than the second reading condition data, and a controller adapted to control the first reading unit based on the determination by the determination unit, wherein the controller directs the first reading unit to read the image when the determination unit determines that the first reading condition data are not greater than the second reading condition data, and the controller directs the first reading unit not to read the image when the determination unit determines that the first reading condition data are greater than the second reading condition data.

According to the above aspect of the invention, based on the number of times of the read operations already performed with the book and the limit to the number of times of the read operations, it is possible to restrict the number of times of read operations, and therefore, to prevent illegal copying.

To attain the above object, according to a 24th aspect of the present invention, there is provided an image forming apparatus adapted to read image from a page of a book, a data storage unit being attached to the book and recorded with control data, the image forming apparatus comprising a first reading unit adapted to optically read the image on the page, a second reading unit adapted to read the control data including reading condition data of reading operations performed with the book, a writing unit adapted to write the reading condition data to the data storage unit, a determination unit adapted to determine whether the reading condition data is included in the control data obtained by the second reading unit, and a controller adapted to control the first reading unit and the writing unit based on the determination by the determination unit, wherein the controller directs the first reading unit to read the image when the determination unit determines that the reading condition data is included in the control data, and the controller directs the writing unit to write the reading condition data to the data storage unit when the determination unit determines that the reading condition data is not included in the control data.

According to the above aspect of the invention, device information is written to the data storage unit when necessary, and when misuse of images occurs, it is possible to uniquely identify the device that committed the illegal action, thereby enabling pursuit of the device.

To attain the above object, according to a 25th aspect of the present invention, there is provided an image forming apparatus adapted to read image from a page of a book, a data storage unit being attached to the book and recorded with control data, the image forming apparatus comprising a first reading unit adapted to optically read the image on the page, a second reading unit adapted to read the control data including copyright data of the book from the data storage unit, a transmission unit adapted to transmit the copyright data to a device outside, and a determination unit adapted to determine whether reading the image from the book is permitted based on the copyright data, and a controller adapted to control the transmission unit based on the determination by the determination unit, wherein the controller directs the first reading unit to read the image when the determination unit determines that reading the image from the book is permitted, and the controller directs the transmission unit to transmit the copyright data to the device outside when the determination unit determines that reading the image from the book is not permitted.

According to the above aspect of the invention, when image reading is not permitted, the first reading unit is controlled not to operate, and this restricts illegal reading or copying.

To attain the above object, according to a 26th aspect of the present invention, there is provided an image forming apparatus adapted to read image from a page of a book, a data storage unit being attached to the book and recorded with control data, the image forming apparatus comprising a first reading unit adapted to optically read the image on the page, a second reading unit adapted to read the control data including copyright data of the book from the data storage unit, a recording unit adapted to record the image obtained by the first reading unit to the target medium, a determination unit adapted to determine whether reading the image from the book is permitted based on the copyright data, and a controller adapted to control the recording unit based on the determination by the determination unit, wherein the controller directs the recording unit to record the image to the target medium when the determination unit determines that reading the image from the book is permitted, and the controller directs the recording unit not to record the image to the target medium when the determination unit determines that reading the image from the book is not permitted.

According to the above aspect of the invention, when image reading is not permitted, copyright information or device information is sent to a specified website of another device so as to report the information of the device that committed illegal reading or copy.

To attain the above object, according to a 27th aspect of the present invention, there is provided a program executed by a computer for reading an image from a page of a book, a data storage unit being attached to the book and recorded with control data, the program comprising a first step of reading the control data including reading condition data of reading operations performed with the book, a second step of determining whether the reading condition data are included in the control data, and a third step of executing one of the operation of reading the image from the page when the reading condition data are included in the control data and the operation of writing the reading condition data to the data storage unit when the reading condition data are not included in the control data.

To attain the above object, according to a 28th aspect of the present invention, there is provided a storage medium that stores a program executed by a computer for reading an image from a page of a book, a data storage unit being attached to the book and recorded with control data, the program comprising a first step of reading the control data including reading condition data of reading operations performed with the book, a second step of determining whether the reading condition data are included in the control data, and a third step of executing one of the operation of reading the image from the page when the reading condition data are included in the control data and the operation of writing the reading condition data to the data storage unit when the reading condition data are not included in the control data.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention will be explained with reference to the accompanying drawings.

First, a data recording medium according to embodiments of the present invention is explained below with reference to FIG. 1. This data recording medium is used in the following embodiments of the present invention.

Figure 1:
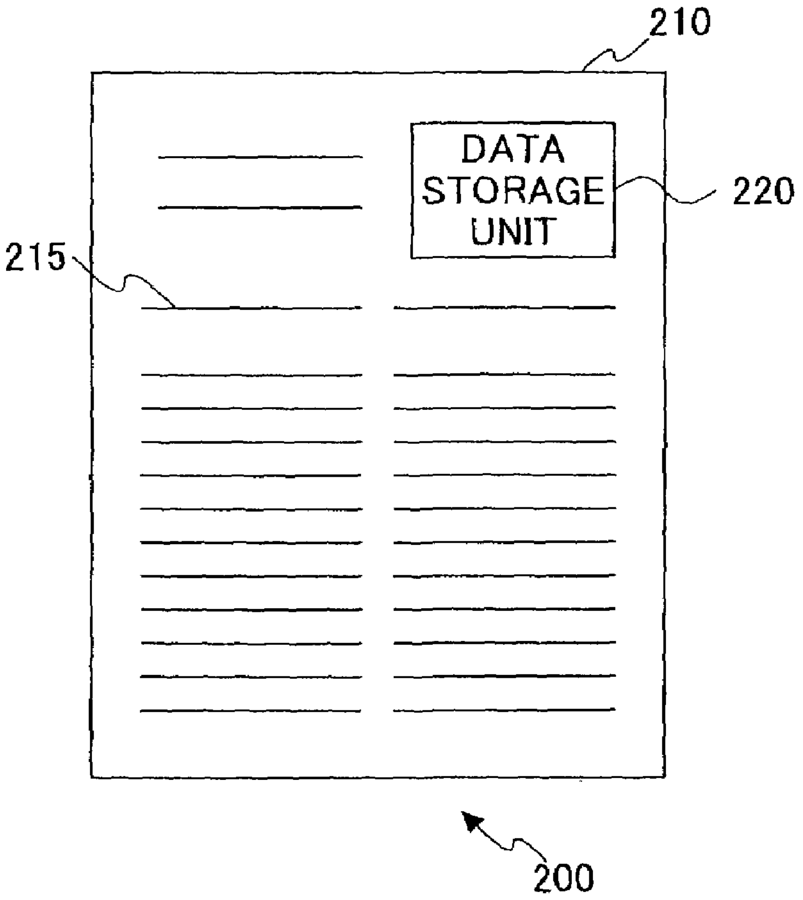
FIG. 1 is a schematic view of a data recording medium according to embodiments of the present invention.

FIG. 1 is a schematic view of a data recording medium 200 of an embodiment of the present invention.

The data recording medium 200 includes a medium 210 and a data storage unit 220. For example, the data recording medium 200 is a document, more specifically, a confidential document, or a bill, or a securities document.

For example, the medium 210 is paper, and data 215 are printed on it. Here, the data 215 may include letters or patterns. The data 215 corresponds to "visibly printed image" of the invention. Note that the medium 210 is not limited to paper; it may be a CD-ROM (Compact Disk Read Only Memory), an IC card, a memory card, a plastic card, or any other medium. If the medium 200 is a CD-ROM, the data 215 are data stored therein.

The data storage unit 220 includes a not-illustrated antenna coil to receive electro-magnetic energy and receive and transmit data; and a RFID (Radio Frequency Identification) chip obtained by combining a memory and an ASIC (Application Specific Integrated Circuit) into a single chip.

By the antenna coil, the data storage unit 220 receives electromagnetic waves transmitted from reading devices or writing devices described in the following embodiments, and generates necessary electrical power from the received electromagnetic waves to perform read or write operations according to commands or data carried in the electromagnetic waves received by the data storage unit 220.

The data storage unit 220 is attached to the medium 210; for example, the data storage unit 220 may be embedded in the medium 210, or pasted in the medium 210. In the data storage unit 220, encrypted reading permission information and recording permission information described below are stored. The reading permission information and recording permission information are part of "the control data" of the invention. Note that the control data are not limited to the reading permission information and recording permission information; they may include communication permission data indicating whether communication of the image data is permitted, and display permission information indicating whether it is permitted to display the image data. Further, the data storage unit 220 is able to write the data such as the encrypted reading permission information and recording permission information.

First Embodiment

This embodiment relates to a recording medium reading device that reads the image data 215 from the data recording medium 200.

Figure 2:
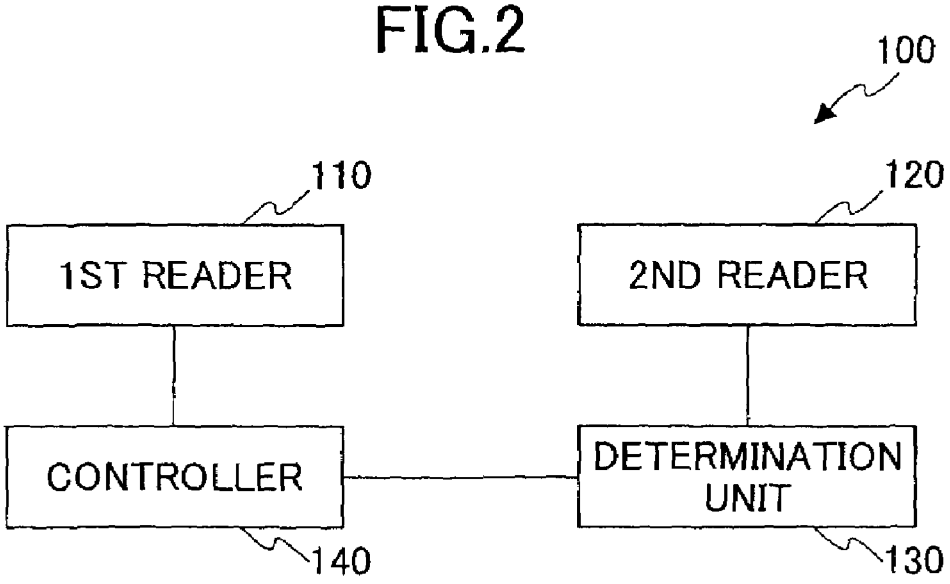
FIG. 2 is a block diagram of a configuration of a recording medium reading device according to a first embodiment of the present invention.

FIG. 2 is a block diagram of a configuration of a recording medium reading device 100 according to the first embodiment of the present invention.

The recording medium reading device 100 comprises a first reader 110, a second reader 120, a determination unit 130, and a controller 140.

The first reader 110 is provided to read the image data. For example, the first reader 110 may be a scanner, or a digital camera, or a disk drive, or a card reader, or a memory card unit, or any other device capable of reading data from a medium.

The second reader 120 reads "reading permission data" included in the control data, which indicates whether it is permitted to read the image data.

The determination unit 130 is connected to the second reader 120, and based on the reading permission data obtained by the second reader 120, the determination unit 130 ascertains if reading of the image data by the first reader 110 is permitted.

The controller 140 includes a CPU (Central Processing Unit), and is connected to the first reader 110 and the determination unit 130. When the determination unit 130 ascertains that it is not permitted to read the image data, the controller 140 directs to stop reading the image data; whereas when the determination unit 130 ascertains that reading of the image data is permitted, the controller 140 directs to read the image data.

Next, the operation of the recording medium reading device 100 is explained below.

Figure 3:
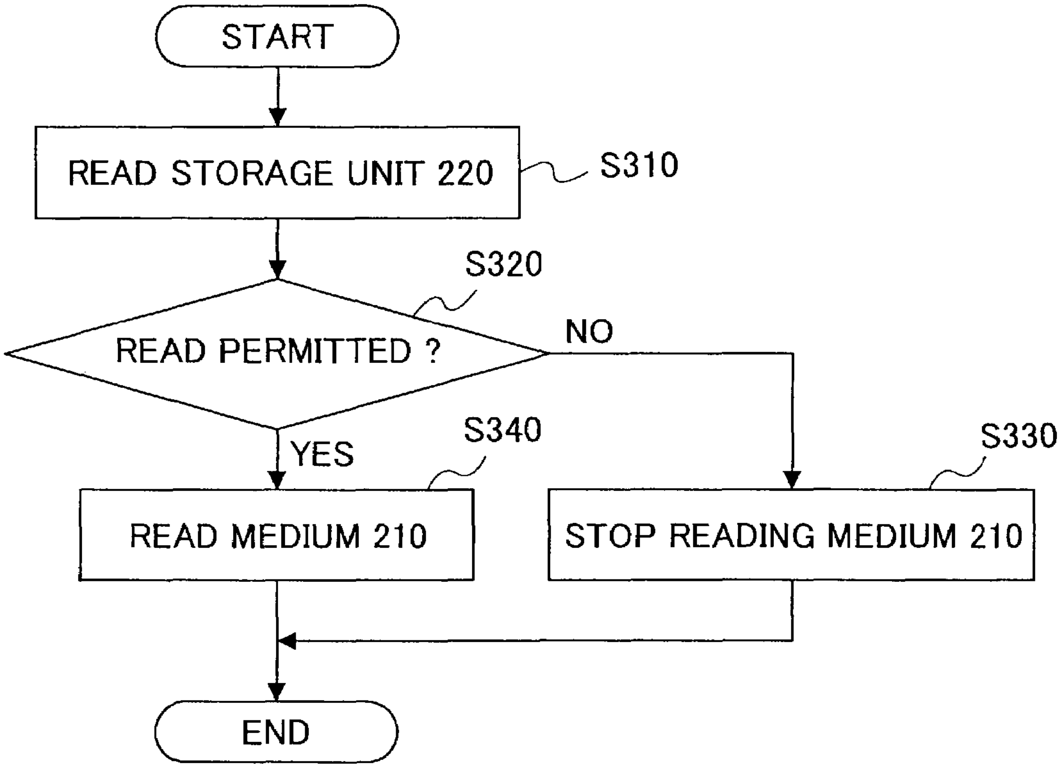
FIG. 3 is a flow chart showing the operation of the recording medium reading device of the first embodiment of the present invention.

FIG. 3 is a flow chart showing the operation of the recording medium reading device 100 of the first embodiment of the present invention.

Referring to FIG. 3, in step S310, from the control data, the second reader 120 reads the reading permission data that indicates whether it is permitted to read the image data.

In step S320, if it is not permitted to read the image data, the routine proceeds to step S330, whereas if it is permitted to read the image data, the routine proceeds to step S340.

In step S330, the controller 140 directs the first reader 110 to stop reading the image data.

In step S340, the controller 140 directs the first reader 110 to read the image data.

Further, programs can be created to execute the above steps, and operation of the device of the present embodiment can be controlled by a computer based on the programs.

In this way, when the first reader 110 reads the data 215 (the image data) recorded on the medium 210, if the determination unit 130 ascertains that it is not permitted to read the image data, it is possible to control the first reader 110 to stop reading the data 215, and thereby preventing forgery of the data recording medium 200, and this further allows prevention of displaying the image data, and transmission of the image data.

Second Embodiment

This embodiment relates to a recording device that reads the image data 215 from the data recording medium 200 and records the image data 215 to other media.

Figure 4:
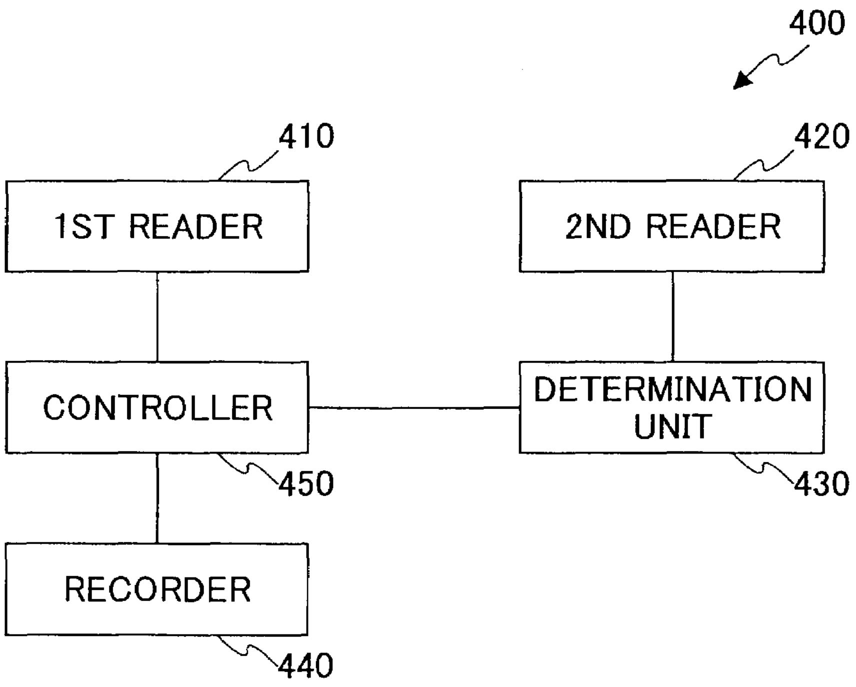
FIG. 4 is a block diagram of a configuration of a recording device according to a second embodiment of the present invention.

FIG. 4 is a block diagram of a configuration of a recording device 400 according to the second embodiment of the present invention.

The recording device 400 comprises a first reader 410, a second reader 420, a determination unit 430, a recorder 440, and a controller 450.

The first reader 410 is provided to read the image data 215. For example, the first reader 410 may be a scanner, or a digital camera, or a disk drive, or a card reader, or a memory card unit, or any other device capable of reading data from a medium.

The second reader 420 reads "recording permission data" included in the control data, which indicates whether it is permitted to record the image data to other media.

The determination unit 430 is connected to the second reader 420. Based on the recording permission data obtained by the second reader 420, the determination unit 430 ascertains if recording of the image data to other media is permitted.

The recorder 440 records one of the image data 215 obtained by the first reader 410 and specified data to a not-illustrated medium other than the medium 210 in the data recording medium 200. Here, the "specified data" may be any information different from the image data 215, for example, data having a different color from the image data 215, or a warning message; the "other medium" may be a medium the same as the medium 210 but in another data recording medium 200, or paper on which data are to be recorded, for example, paper used in a copier when making a copy of the data recording medium 200. Below, the other medium is referred to as "copy destination", and the data recording medium 200 read by the first reader is referred to as "copy source". To the other medium, a copy of the copy source is to be written.

The controller 450 includes a CPU (Central Processing Unit), and is connected to the first reader 410, the determination unit 430, and the recorder 440. When the determination unit 430 ascertains that recording of the image data to the other medium is not permitted, the controller 450 directs the recorder 440 to record the specified data to the other medium. When the determination unit 430 ascertains that recording of the image data to the other medium is permitted, the controller 450 directs the recorder 440 to record the image data 215 to the other medium. When the determination unit 430 ascertains that recording of the image data to the other medium is not permitted, for example, the user may contact the police, or the manager of the copy machine in use.

Next, the operation of the recording device 400 is explained below.

Figure 5:
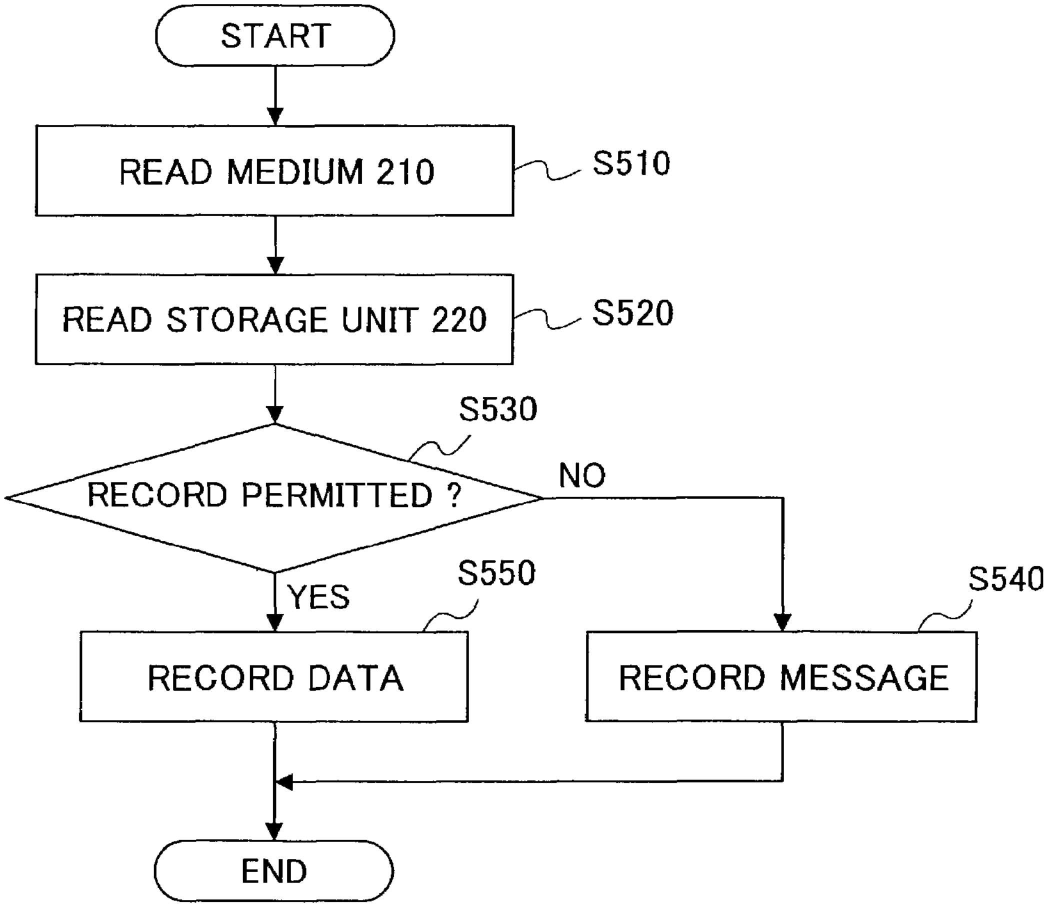
FIG. 5 is a flow chart showing the operation of the recording device of the second embodiment of the present invention.

FIG. 5 is a flow chart showing the operation of the recording device 400 of the second embodiment of the present invention.

Referring to FIG. 5, in the step S510, the first reader 410 reads the data 215 (the image data) from the data recording medium 200.

In step S520, from the control data, the second reader 420 reads the recording permission data that indicates whether recording of the image data 215 to other media is permitted.

In step S530, the determination unit 430 ascertains if recording of the image data to other media is permitted. If it is not permitted to record the image data 215 to other media, the routine proceeds to step S540, whereas if it is permitted to record the image data 215 to other media, the routine proceeds to step S550.

In step S540, the controller 450 directs the recorder 440 to record the specified data to the other medium.

In step S550, the controller 450 directs the recorder 440 to record the image data 215 to the other medium.

Further, the above steps can be executed by creating appropriate programs; based on these programs, the operation of the device of the present embodiment can be controlled by a computer.

According to the present embodiment, when recording of the image data 215 is not permitted, if the recorder 440 tries to record the image data 215 to any other medium, a warning message or other data different from the image data 215 are recorded. In this way, forgery of the data recording medium 200 is preventable.

Third Embodiment

This embodiment relates to a recording device that reads the image data 215 from the data recording medium 200 and records the image data 215 to other media.

Figure 6:
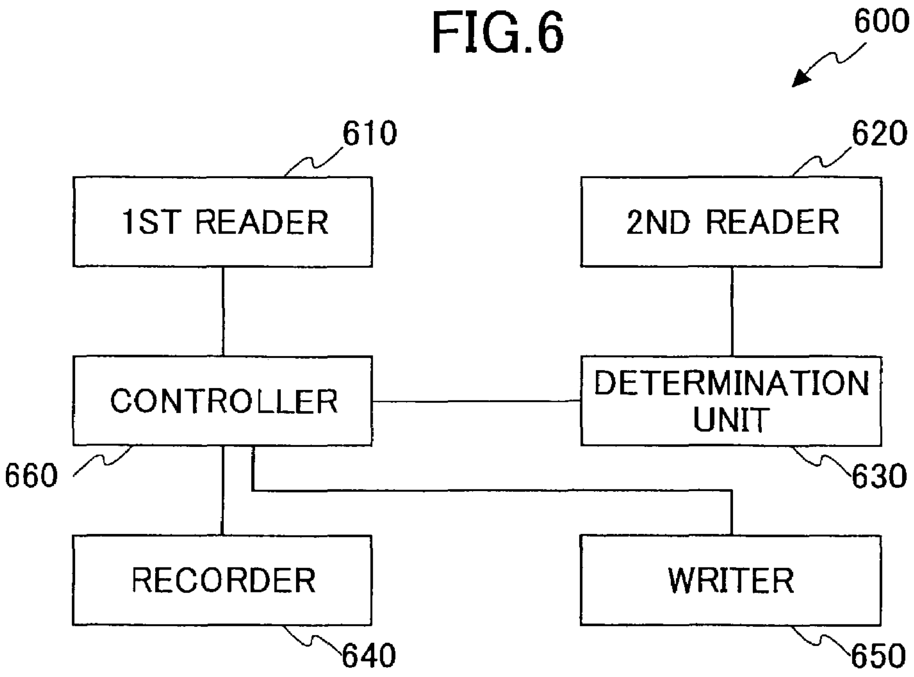
FIG. 6 is a block diagram of a configuration of a recording device according to a third embodiment of the present invention.

FIG. 6 is a block diagram of a configuration of a recording device 600 according to the third embodiment of the present invention.

The recording device 600 comprises of a first reader 610, a second reader 620, a determination unit 630, a recorder 640, a writer 650 and a controller 660.

The first reader 610 is provided to read the image data 215. For example, the first reader 610 may be a scanner, or a digital camera, or a disk drive, or a card reader, or a memory card unit, or any other device capable of reading data from a medium.

The second reader 620 reads "recording permission data" included in the control data, which indicates whether it is permitted to record the image data to other media.

The determination unit 630 is connected to the second reader 620. Based on the recording permission data obtained by the second reader 620, the determination unit 630 ascertains if recording of the image data 215 to other media is permitted.

The recorder 640 records the image data 215 obtained by the first reader 610 to a not-illustrated medium other than the medium 210 in the data recording medium 200. Here, the "other medium" may be a medium the same as the medium 210 but in another data recording medium 200, or paper on which data are to be recorded, for example, paper used in a copier when making a copy of the data recording medium 200. Below, the other medium is referred to as "copy destination", and the data recording medium 200 read by the first reader is referred to as "copy source". To the other medium, a copy of the copy source is to be written.

The writer 650 writes user identification information to the data storage unit 220 in the data recording medium 200 shown in FIG. 1. The "user identification information" is data for identifying a user, such as time and date when the user makes copies, prints, or reads data, locations, or user identification numbers.

The controller 660 includes a CPU (Central Processing Unit), and is connected to the first reader 610, the determination unit 630, the recorder 640, and the writer 650. When the determination unit 630 ascertains that recording of the image data to the other medium is not permitted, the controller 660 directs the writer 650 to write the user identification information to the data storage unit 220 in the data recording medium 200, a copy of which is to be made (the so-called called "copy source").

Next, the operation of the recording device 600 is explained below.

Figure 7:
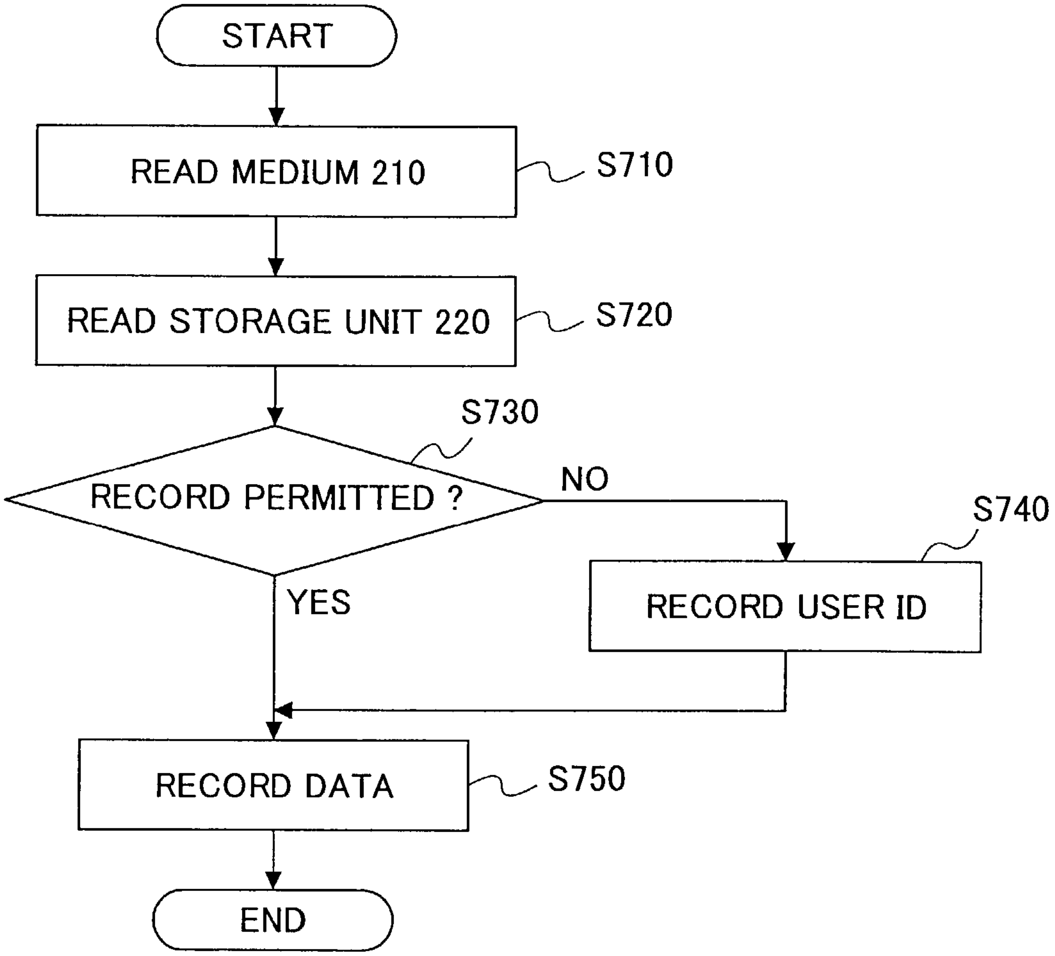
FIG. 7 is a flow chart showing the operation of the recording device of the third embodiment of the present invention.

FIG. 7 is a flow chart showing the operation of the recording device 600 of the third embodiment of the present invention.

Referring to FIG. 7, in step S710, the first reader 610 reads the image data 215 from the data recording medium 200.

In step S720, from the control data, the second reader 620 reads the recording permission data that indicates whether recording the image data 215 to other media is permitted.

In step S730, based on the recording permission data, the determination unit 630 ascertains if recording of the image data to other media is permitted. If it is not permitted to record the image data 215 to other media, the routine proceeds to step S740, whereas if it is permitted to record the image data 215 to other media, the routine proceeds to step S750.

In step S740, the controller 660 directs the writer 650 to write the user identification information to the data storage unit 220 in the data recording medium 200.

In step S750, the controller 660 directs the recorder 640 to record the image data 215 to the other medium.

Further, programs can be created to execute the above steps, and operation of the device of the present embodiment can be controlled by a computer based on the programs.

In this way, according to the above recording device 600, when the recorder 640 tries to record the image data 215 to any other medium, it is possible to control the operation of the writer 650 based on the recording permission data on the data storage unit 220. If recording of the image data 215 is not permitted, user identification information is written to the data storage unit 220 as evidence of operation of the data recording medium 200 (the copy source). Therefore, this makes it possible to prevent forgery of the data on the data recording medium 200, and enables a later follow-up survey.

Fourth Embodiment

This embodiment relates to a recording device that reads the image data 215 from the data recording medium 200 and records the image data 215 to other media.

Figure 8:
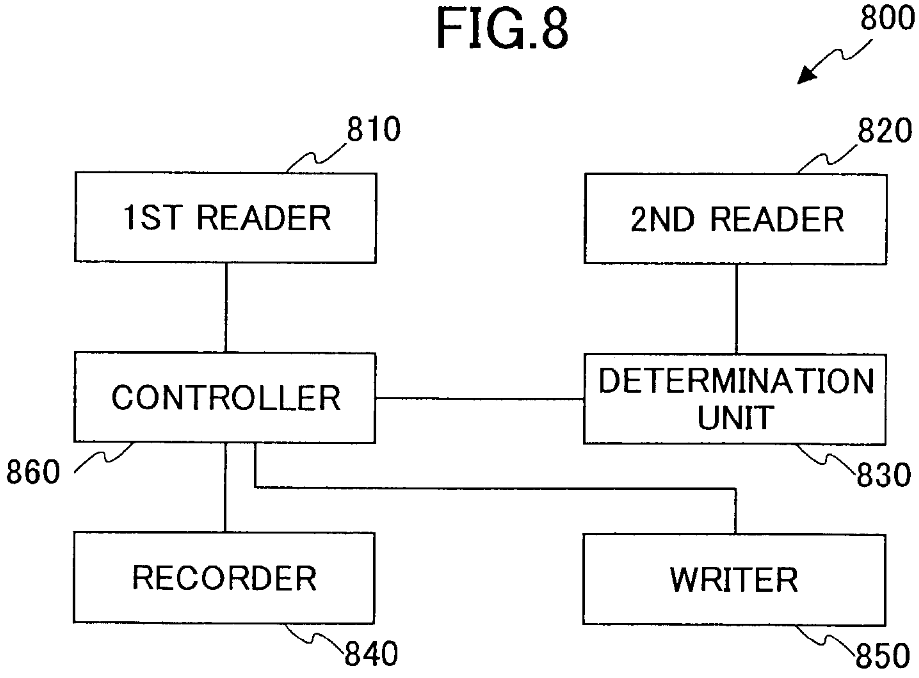
FIG. 8 is a block diagram of a configuration of a recording device according to a fourth embodiment of the present invention.

FIG. 8 is a block diagram of a configuration of a recording device 800 according to the fourth embodiment of the present invention.

The recording device 800 comprises a first reader 810, a second reader 820, a determination unit 830, a recorder 840, a writer 850 and a controller 860.

The first reader 810 is provided to read the image data 215. For example, the first reader 810 may be a scanner, or a digital camera, or a disk drive, or a card reader, or a memory card unit, or any other device capable of reading data from a medium.

The second reader 820 reads "recording permission data" included in the control data, which indicates whether it is permitted to record the image data to other media.

The determination unit 830 is connected to the second reader 820. Based on the recording permission data obtained by the second reader 820, the determination unit 830 ascertains if recording the image data 215 to other media is permitted.

The recorder 840 records the image data 215 obtained by the first reader 810 to a not-illustrated medium other than the medium 210 in the data recording medium 200. Here, the "other medium" may be a medium the same as the medium 210 but in another data recording medium 200, or paper on which data are to be recorded, for example, paper used in a copier when making a copy of the data recording medium 200.

Below, the another data recording medium 200 including the other medium is referred to as "copy destination", and the data recording medium 200 read by the first reader is referred to as "copy source". That is, the data recording medium acting as the copy destination is identical to the data recording medium 200 shown in FIG. 1; it has a medium, the "other medium" as mentioned above, the same as the medium 210, and a data storage unit the same as the data storage unit 220. To the medium of the copy destination, a copy of the copy source is to be written.

The writer 850 writes user identification information to the data storage medium of the copy destination. The "user identification information" is data for identifying a user, such as time and date when the user makes copies, makes printings, or reads data, locations, or user identification numbers.

The controller 860 includes a CPU (Central Processing Unit), and is connected to the first reader 810, the determination unit 830, the recorder 840, and the writer 850. When the determination unit 830 ascertains that recording of the image data to the other medium is not permitted, the controller 860 directs the writer 850 to write the user identification information to the data storage medium of the data recording medium acting as the copy destination.

Next, the operation of the recording device 800 is explained below.

Figure 9:
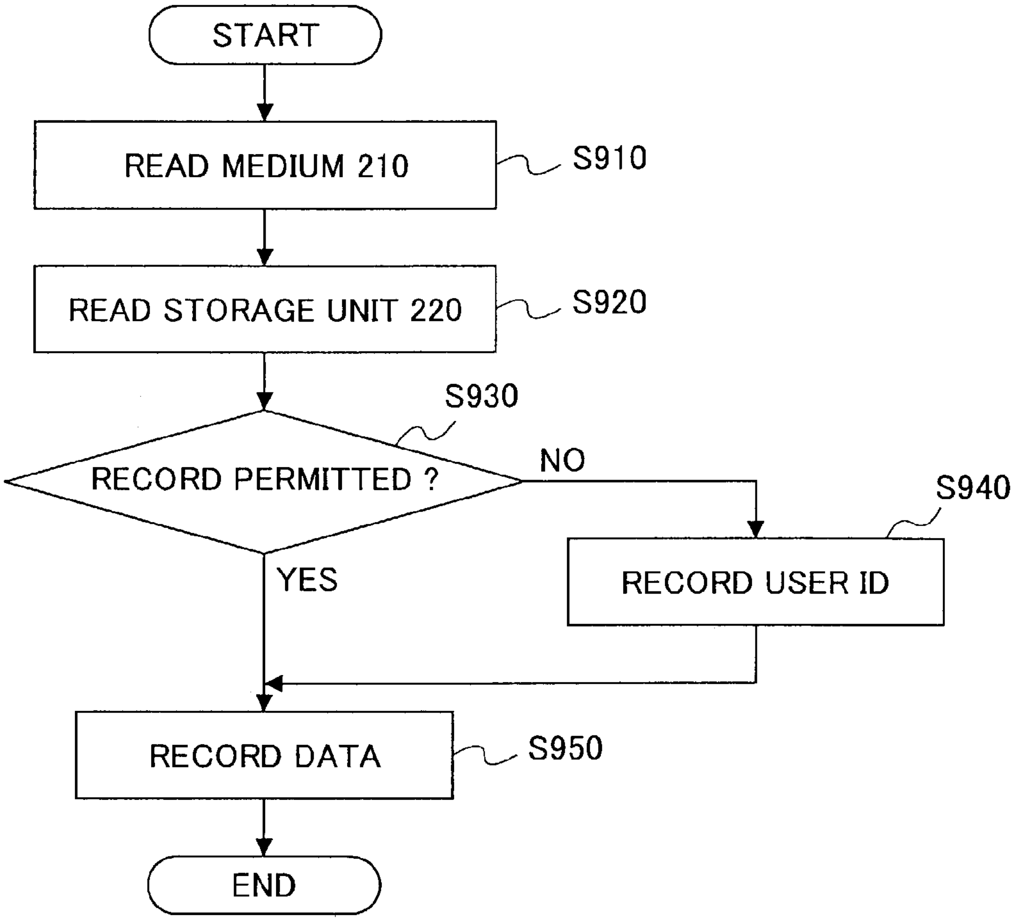
FIG. 9 is a flow chart showing the operation of the recording device of the fourth embodiment of the present invention.

FIG. 9 is a flow chart showing the operation of the recording device 800 of the fourth embodiment of the present invention.

Referring to FIG. 9, in step S910, the first reader 810 reads the image data 215 from the data recording medium 200.

In step S920, from the control data, the second reader 820 reads the recording permission data that indicates whether recording the image data 215 to other media is permitted.

In step S930, based on the recording permission data, the determination unit 830 ascertains if recording of the image data 215 to other media is permitted. If it is not permitted to record the image data 215 to other media, the routine proceeds to step S940, whereas if it is permitted to record the image data 215 to other media, the routine proceeds to step S950.

In step S940, the controller 860 directs the writer 850 to write the user identification information to the data storage medium of the data recording medium acting as the copy destination.

In step S950, the controller 860 directs the recorder 840 to record the image data 215 to the medium of the data recording medium acting as the copy destination.

Further, programs can be created to execute the above steps, and operation of the device of the present embodiment can be controlled by a computer based on the programs.

In this way, when making a copy of the data recording medium 200, specifically, when the recorder 840 tries to records the image data 215 to any other medium, according to the above recording device 800, it is possible to control the operation of the writer 850 based on the recording permission data on the data storage unit 220. If recording of the image data 215 is not permitted, user identification information is written to the data storage medium of the data recording medium acting as the copy destination as evidence of operation of the data recording medium 200. Therefore, this makes it possible to prevent forgery of the data on the data recording medium 200, and enables a later follow-up survey.

Fifth Embodiment

Figure 10:
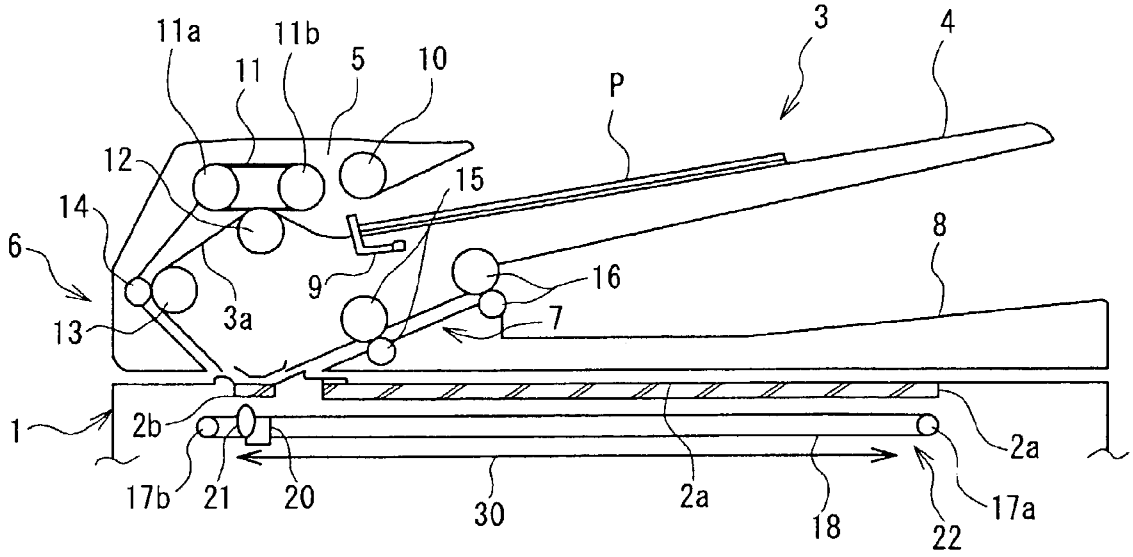
FIG. 10 is a cross-sectional view showing an overall configuration of a duplicating apparatus according to a fifth embodiment of the present invention.

FIG. 10 is a view showing an overall configuration of a duplicating apparatus according to the fifth embodiment of the present invention.

The duplicating apparatus shown in FIG. 10 includes a main body 1 and an ADF (Auto Document Feeder) 3. On the upper side of the main body 1, a contact glass 2*a* and a slit glass 2*b* smaller than the contact glass 2*a* are provided.

Note that the configuration shown in FIG. 10 is presented just for illustration; the duplicating apparatus of the present embodiment is not limited to this configuration; it may be a facsimile machine, a scanner, or an apparatus combining all of them.

The ADF 3 is provided on the main body 1. With a hinge mechanism, one end of the ADF 3 can be moved up and down freely to cover or make the contact glass 2*a* open.

Next, the configuration of the main body 1 is explained.

Figure 11:
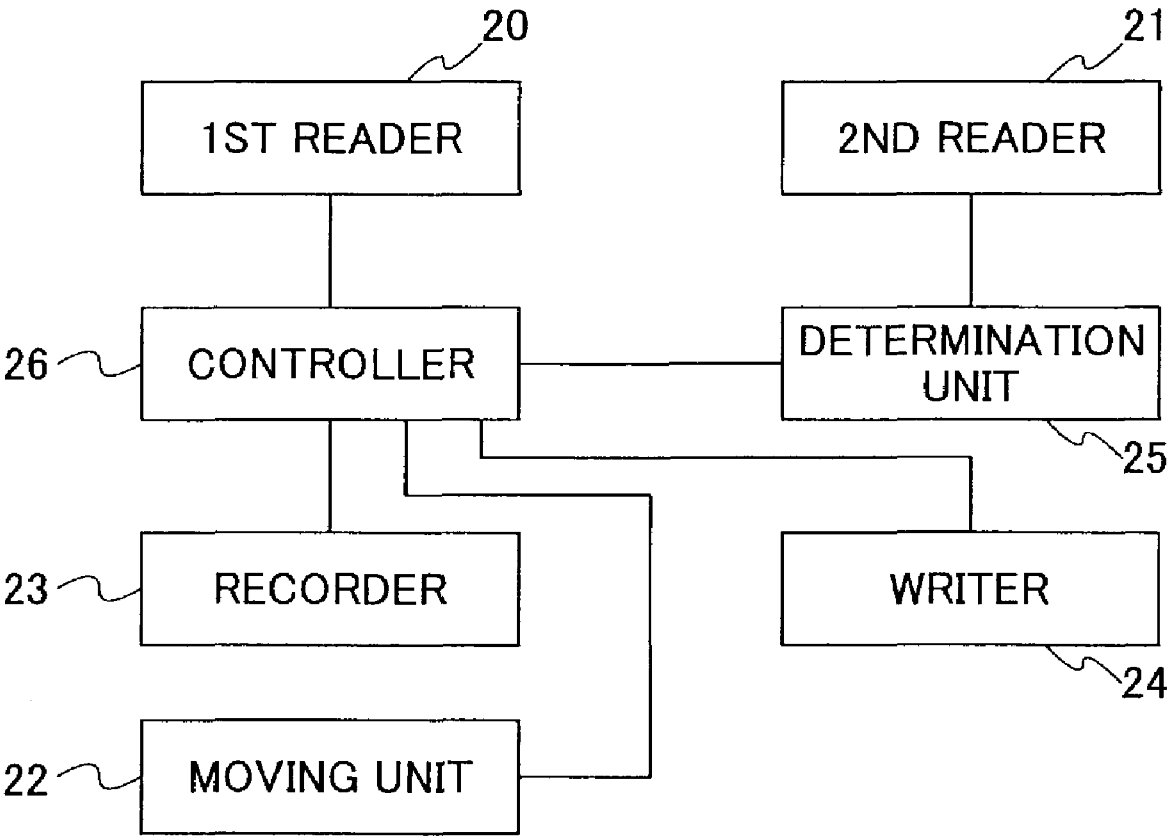
FIG. 11 is a block diagram of a configuration of the duplicating apparatus according to the fifth embodiment of the present invention.

FIG. 11 is a block diagram of a configuration of the duplicating apparatus according to the fifth embodiment of the present invention.

As shown in FIG. 11, the main body 1 includes a first reader 20, a second reader 21, a moving unit 22, a recorder 23, a writer 24, a determination unit 25, and a controller 26.

The first reader 20 reads the image data in the data recording medium 200 as shown in FIG. 1. Detailed description of the data recording medium 200 is omitted here. The first reader 20 at least includes a light emitting source, a reflective mirror, a condensing lens, and a CCD (Charge Coupled Device).

The second reader 21 is mounted integrally with the first reader 20, and while the first reader 20 reads the image data, the second reader 21 reads "recording permission data" from the control data, which indicates whether recording of the image data is permitted.

The moving unit 22 includes a driving roller 17*a* driven by a not-illustrated driving device, a driven roller 17*b*, and a wire 18. The wire 18 is wound on the driving roller 17*a* and driven roller 17*b*, and the first reader 20 is fixed on the wire 18. The moving unit 22 moves the first reader 20 and the second reader 21 under the contact glass 2*a*, acting as a supporting member, back and forth along the directions indicated by the arrow 30. In FIG. 10, the length of the arrow 30 indicates the region in which the first reader 20 and the second reader 21 move.

The recorder 23 records the image data 215 read by the first reader 20 from the data recording medium 200 to a not-illustrated medium of another data recording medium 200.

Here, the another data recording medium 200 acts as a copy destination, and the data recording medium 200 read by the first reader is thus referred to as "copy source". That is, the data recording medium acting as the copy destination is identical to the data recording medium 200 shown in FIG. 1; it has a medium the same as the medium 210, and a data storage unit the same as the data storage unit 220; to the medium of the copy destination, the image data 215 is to be recorded to make a copy of the data recording medium 200 (copy source).

The writer 24 writes the control data to the data recording medium that is the copy destination.

The determination unit 25, based on the recording permission data obtained by the second reader 21, ascertains if recording the image data 215 is permitted.

The controller 26 includes a CPU (Central Processing Unit). When the determination unit 25 ascertains that recording the image data to other media is not permitted, the controller 25 directs the recorder 23 and the writer 24 not to write the image data and the control data, respectively, to the data recording medium acting as the copy destination. While, when the determination unit 25 ascertains that recording the image data to other media is permitted, the controller 25 directs the recorder 23 and the writer 24 to write the image data and the control data, respectively, to the copy destination.

Note that the first reader 20 and the second reader 21 may be attached to the main body 1 separately. For example, the second reader 21 may be mounted on the feeding path of the data recording medium extending from a loading member 10 mentioned below to the first pair of paper delivery rollers 15 and the second pair of paper delivery rollers 16.

Next, the configuration of the ADF 3 is explained.

The ADF 3 includes a recording medium tray 4, a stopping portion 5, a transportation portion 6, a delivery portion 7, and a delivery tray 8.

In the recording medium tray 4, a number of data recording media 200 (indicated by a letter "P") are placed, and the data recording media 200 are separated into single pages by the separation portion 5. Certainly, not only the data recording medium 200, but also any other medium without a data storage unit 220 as shown in FIG. 1, such as a medium printed with letters or images, may be placed in the recording medium tray 4.

The separation portion 5 includes a blocker 9, a loading member 10, a feeding belt 11, and a separation roller 12.

The blocker 9 blocks the data recording media 200 in the recording medium tray 4 from entering the separation unit 5, and aligns the ends of the data recording media 200 when the data recording media bump their ends against the blocker 9. By a not-illustrated blocking solenoid, the blocker 9 is movable between a position where the blocker 9 may touch the ends of the data recording media 200 and a position away from the data recording media 200.

The loading member 10 is also movable, by using a not-illustrated loading solenoid, between a position where the loading member 10 may touch the data recording media 200 and a position away from the data recording media 200. Being driven by a feeding start signal from the main body 1, the loading solenoid moves the loading member 10 close to the data recording media 200 to feed the upper most data recording medium 200 to the separation unit 5. At this time, the blocking solenoid is also driven and moves the blocker 9 away from the data recording media 200.

The feeding belt 11 is wound on the driving roller 11*a* and the driven roller 11*b*. When separating the data recording media 200, by a not-illustrated feeding motor, the driving roller 11*a* is driven to rotate clockwise, and thus the feeding belt 11 is driven to rotate.

The separation roller 12 is in contact with the feeding belt 11, and is driven by the feeding motor to rotate clockwise, thereby separating the upper most data recording medium 200.

The transportation portion 6 includes a driving roller 13 and a driven roller 14 in contact with the driving roller 13. The transportation portion 6 sandwiches the data recording medium 200 sent from the separation unit 5, and transports the data recording medium 200 to the slit glass 2*b*, the position where the data recording medium 200 is read by the first reader 20 and the second reader 21.

Inside the main body 1 and under the slit glass 2*b*, the first reader 20 and the second reader 21 are held stationary, and read the image data and the control data, respectively, at the same time from the data recording medium 200 passing over the slit glass 2*b*.

The delivery portion 7 includes a pair of delivery rollers 15 and a pair of delivery rollers 16. The data recording medium 200 that has passed over the slit glass 2*b* is sandwiched by the pair of delivery rollers 15, and the pair of delivery rollers 16 as well, and delivered to the delivery tray 8.

When a data recording medium 200 is placed on the contact glass 2*a* for reading, by moving the first reader 20 and the second reader 21 under the contact glass 2*a* back and forth along the directions indicated by the arrow 30 in FIG. 10, the first reader 20 and the second reader 21 can also read the image data and the control data, respectively, at the same time from the data recording medium 200. Therefore, it is not necessary to mount the second reader 21 under the contact glass 2*a* to cover the range of the data recording medium 200, and this allows reading the control data with a lesser number of the second readers 21 and thus lowering cost. Further, it is possible to reduce the amount of electromagnetic waves, therefore reduce adverse influences on the human body.

Note that, although it is described above that the first reader 20 and the second reader 21 are moved under the contact glass 2*a* back and forth at the same time to read the image data and the control data from the data recording medium 200, the present embodiment is not limited to this. For example, the first reader 20 may read the image data after the second reader 21 reads the control data. More specifically, first, the first reader 20 and the second reader 21 are moved under the contact glass 2*a* back and forth, and the second reader 21 reads the control data from the data recording medium 200; then the first reader 20 and the second reader 21 are moved under the contact glass 2*a* back and forth again, and the first reader 20 reads the image data from the data recording medium 200.

When a data recording medium 200 is placed in the recording medium tray 4 for reading the image data and the control data, the first reader 20 and the second reader 21 are held stationary under the slit glass 2*b* to read the image data and the control data at the same time from the data recording medium 200 transported by the ADF 3.

Next, the operation of the duplicating apparatus of the present embodiment is explained below with reference to following flow charts.

FIG. 12 through FIG. 17 are flow charts showing the operation of the duplicating apparatus of the present embodiment.

Figure 12:
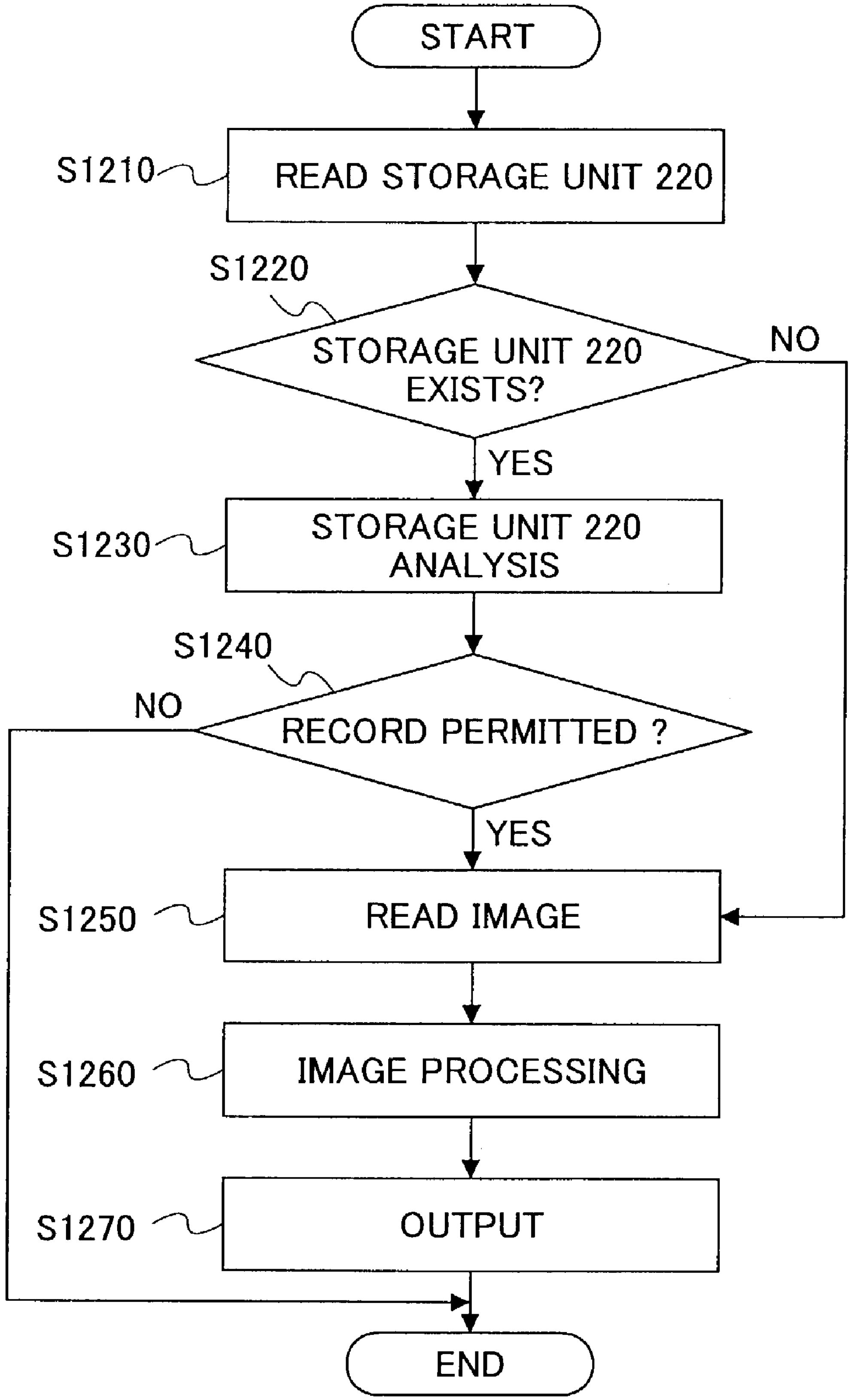
FIG. 12 is a flow chart showing the operation of the duplicating apparatus of the fifth embodiment of the present invention.

Here, the case in which the first reader 20 and the second reader 21 read the image data and the control data, respectively, at the same time, and the case in which the first reader 20 reads the image data after the second reader 21 reads the control data are explained separately; and flow charts in FIG. 13 through FIG. 17 illustrate the former case, and the flow chart in FIG. 12 illustrates the latter case.

First, explanations are made of the case in which the first reader 20 and the second reader 21 read the image data and the control data at the same time from the data recording medium 200.

Figure 13:
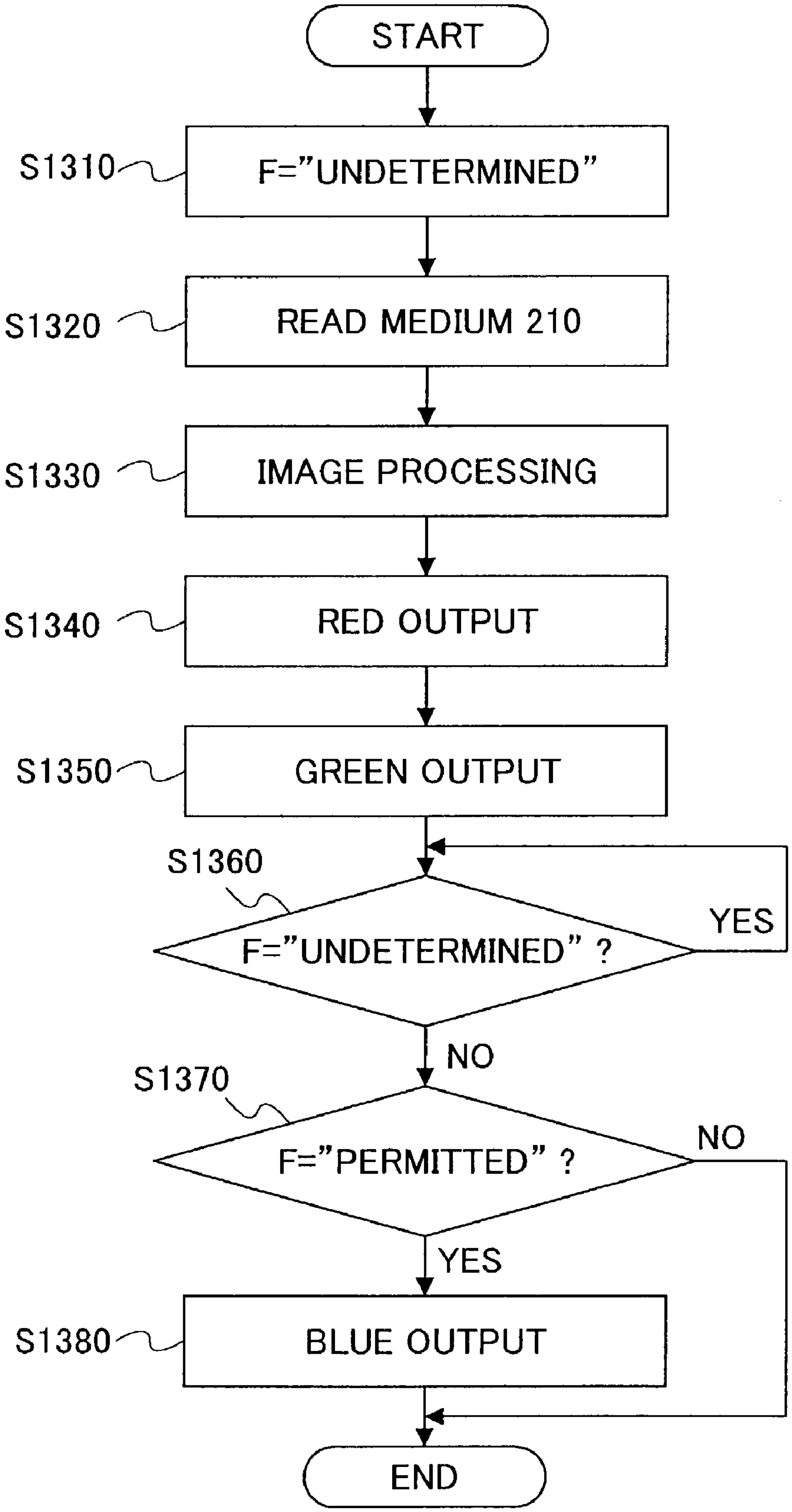
FIG. 13 is a flow chart showing the operation of the duplicating apparatus of the fifth embodiment of the present invention.
Figure 14:
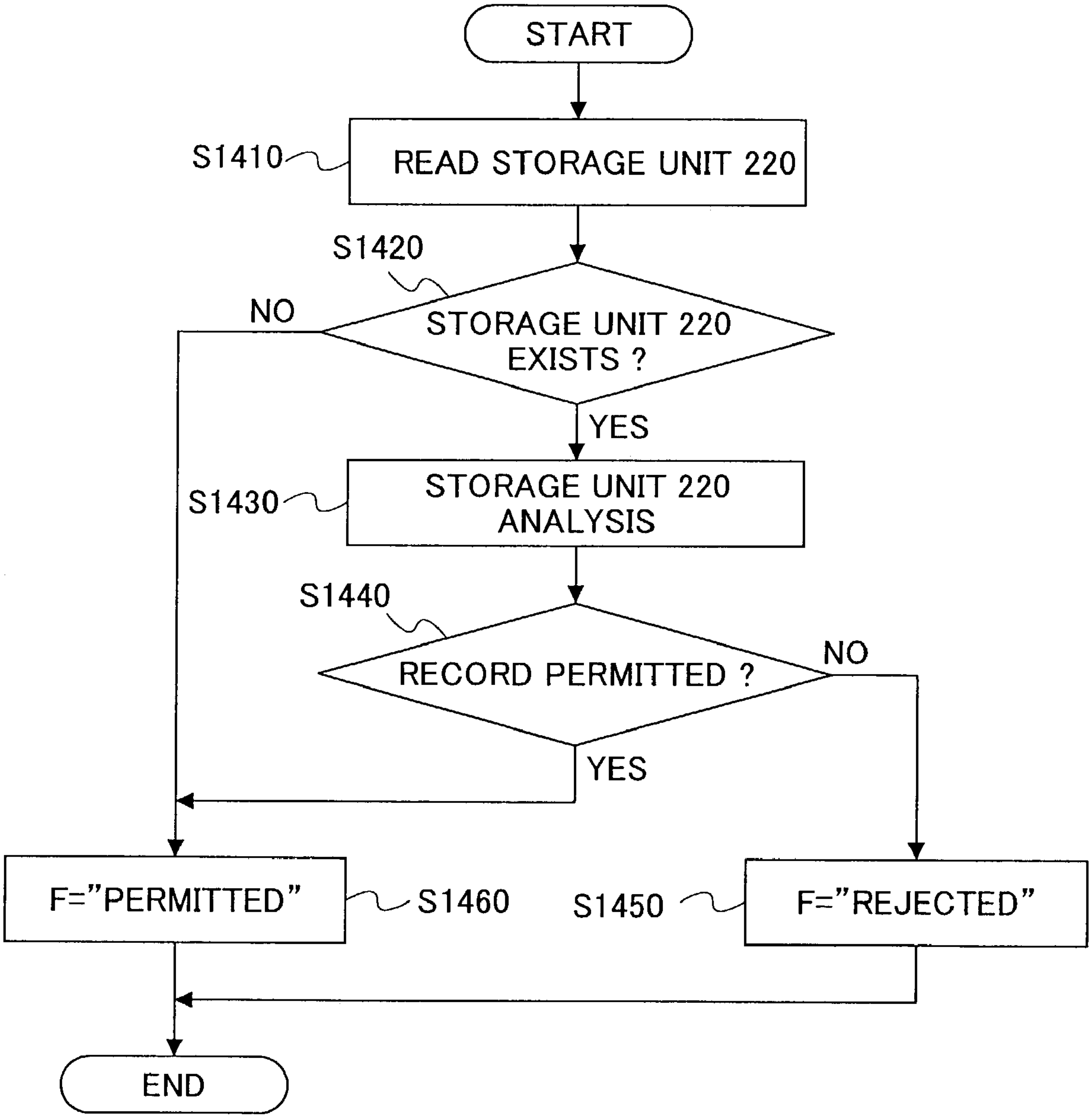
FIG. 14 is a flow chart showing the operation of the duplicating apparatus of the fifth embodiment of the present invention.

FIG. 13 and FIGS. 15 through 17 are flow charts showing the duplication process of the duplicating apparatus of the present embodiment, and FIG. 14 is a flow chart showing the determination process of the duplicating apparatus of the present embodiment.

Here, the duplication process and the determination process are performed in parallel. In addition, in FIG. 13 through 17, "F" is a status variable, having three values of "undetermined", "permitted", and "rejected". For example, the steps after step S1370 in the duplication process shown in FIG. 13 wait until the value of the variable F for recording is determined in the determination process mentioned below.

The determination process is explained below with reference to FIG. 14.

In step S1410, the second reader 21 reads the control data from the data storage unit 220 of the data recording medium 200.

In step S1420, depending on whether reading of the control data is successful or not, the determination unit 25 confirms if the data storage unit 220 is available. If the data storage unit 220 is available, the routine proceeds to step S1430, whereas if the data storage unit 220 is not available (the data storage unit 220 does not exist), the routine proceeds to step S1460.

In step S1430, the determination unit 25 analyzes the data storage unit 220, that is, the control data in the data storage unit 220.

In step S1440, based on the recording permission data included in the control data, the determination unit 25 confirms if recording the image data to the destination data recording medium is permitted. If recording is permitted, the routine proceeds to step S1460, whereas if recording is not permitted, the routine proceeds to step S1450.

In step S1450, the status variable F is assigned a value of "rejected".

In step S1460, the status variable F is assigned a value of "permitted".

Next, the duplication process is explained below with reference to FIG. 13 and FIGS. 15 through 17.

In the present embodiment, there are four kinds of duplication processes. FIG. 13 illustrates the first one. In the duplication process shown in FIG. 13, for example, in a duplicating apparatus able to output red, green, and blue colors, when recording color images as the image data to a medium of a data recording medium acting as a copy destination, if it is confirmed that recording is permitted in the above determination process, the recorder 23 records the image data to the medium of the copy destination, whereas if it is confirmed that recording is not permitted in the above determination process, the recorder 23 records any two colors among the red, green, and blue colors to the medium of the copy destination.

In step S1310, the status variable F is initialized by assigning F a value of "undetermined".

In step S1320, the first reader 20 reads the image data from the medium 210 of the data recording medium 200.

In step S1330, image processing for the image data is performed in order to record the image data, for example, the image processing includes necessary corrections to the image data, scaling-up or scaling-down of the image data.

In step S1340, the recorder 23 records the red color data to a medium of a data recording medium acting as a copy destination.

In step S1350, the recorder 23 records the green color data to the medium of the data recording medium acting as the copy destination.

In step S1360, the determination unit 25 ascertains if the value of the status variable F is "undetermined". If the value of F is "undetermined", the routine waits until F is assigned a value other than "undetermined". The routine proceeds to step S1370 when F is assigned a value other than "undetermined".

In step S1370, the determination unit 25 ascertains if the value of the status variable F is "permitted". If the value of F is "permitted", the routine proceeds to step S1380. If the value of F is not "permitted", the routine ends without the blue data being recorded to the medium of the data recording medium acting as the copy destination, or the control data being recorded to the data storage unit of the data recording medium acting as the copy destination.

In step S1380, the recorder 23 records the blue data to the medium of the data recording medium acting as the copy destination, and at the same time, the writer 24 writes the control data to the data storage unit of the data recording medium acting as the copy destination.

Note that step S1360 and step S1370 may be performed at any time after step S1310 and before step S1380.

Figure 15:
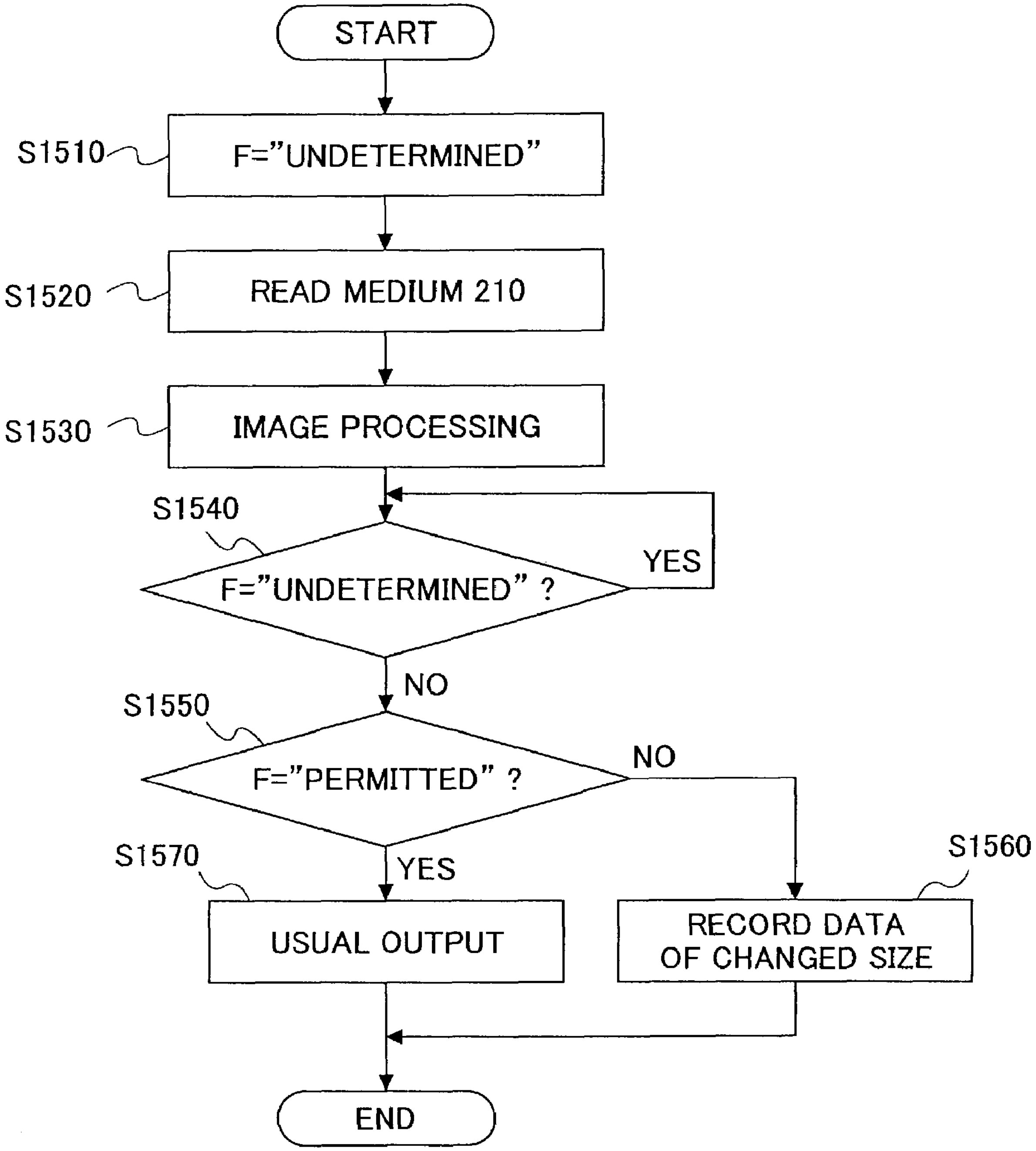
FIG. 15 is a flow chart showing the operation of the duplicating apparatus of the fifth embodiment of the present invention.

FIG. 15 illustrates the second duplication process. In the duplication process shown in FIG. 15, for example, if it is confirmed that recording is permitted in step S1440 of the above determination process, the recorder 23 records the image data, whereas, if it is confirmed that recording is not permitted in step S1440 of the above determination process, the image size of the image data is changed and then recorded to the medium of the data recording medium acting the copy destination.

In step S1510, the status variable F is initialized by assigning F a value of "undetermined".

In step S1520, the first reader 20 reads the image data from the medium 210 of the data recording medium 200.

In step S1530, image processing for the image data is performed in order to record the image data, for example, the image processing includes necessary corrections to the image data, scaling-up or scaling-down of the image data.

In step S1540, the determination unit 25 confirms if the value of the status variable F is "undetermined". If the value of F is "undetermined", the routine waits until F is assigned a value other than "undetermined". The routine proceeds to step S1550 when F is assigned a value other than "undetermined".

In step S1550, the determination unit 25 ascertains if the value of the status variable F is "permitted". If the value of F is not "permitted", the routine proceeds to step S1560, otherwise the routine proceeds to step S1570.

In step S1560, the recorder 23 records image data obtained by changing the image size of the image data serving as the image data to the medium of the data recording medium acting as the copy destination, and then the routine ends.

In step S1570, the recorder 23 records the original first image data to the medium of the data recording medium acting as the copy destination, while the writer 24 writes the control data to the data storage unit of the same data recording medium, and then the routine ends.

Figure 16:
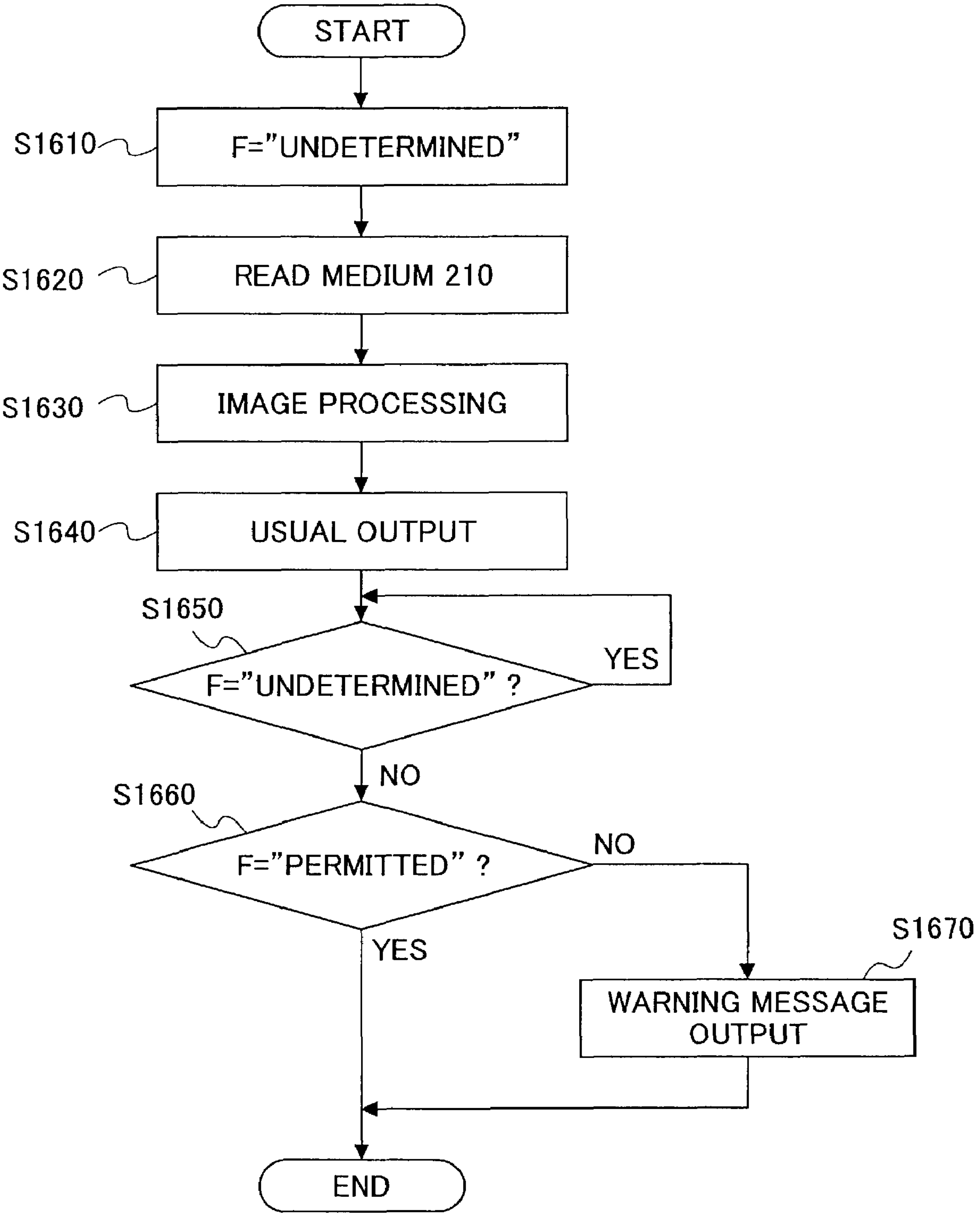
FIG. 16 is a flow chart showing the operation of the duplicating apparatus of the fifth embodiment of the present invention.

FIG. 16 illustrates the third duplication process. In the duplication process shown in FIG. 16, the image data and the control data are recorded and written to the medium and the data storage unit of the data recording medium acting the copy destination beforehand. If it is confirmed that recording is not permitted in step S1440 of the above determination process, a warning message is additionally recorded to the medium of the data recording medium in which the image data and the control data are recorded or written.

In step S1610, the status variable F is initialized by assigning F a value of "undetermined".

In step S1620, the first reader 20 reads the image data from the medium 210 of the data recording medium 200.

In step S1630, image processing for the image data is performed in order to record the image data, for example, the image processing includes necessary corrections to the image data, scaling-up or scaling-down of the image data.

In step S1640, the recorder 23 records the image data to the medium of the data recording medium acting as the copy destination, while the writer 24 writes the control data to the data storage unit of the same data recording medium.

In step S1650, the determination unit 25 confirms if the value of the status variable F is "undetermined". If the value of F is "undetermined", the routine waits until F is assigned a value other than "undetermined". The routine proceeds to step S1660 when F is assigned a value other than "undetermined".

In step S1660, the determination unit 25 ascertains if the value of the status variable F is "permitted". If the value of F is not "permitted", the routine proceeds to step S1670, otherwise the routine proceeds to the end.

In the step S1670, the recorder 23 records a warning message to the medium of the data recording medium acting as the copy destination in which the first image data and the control data recorded or written.

Figure 17:
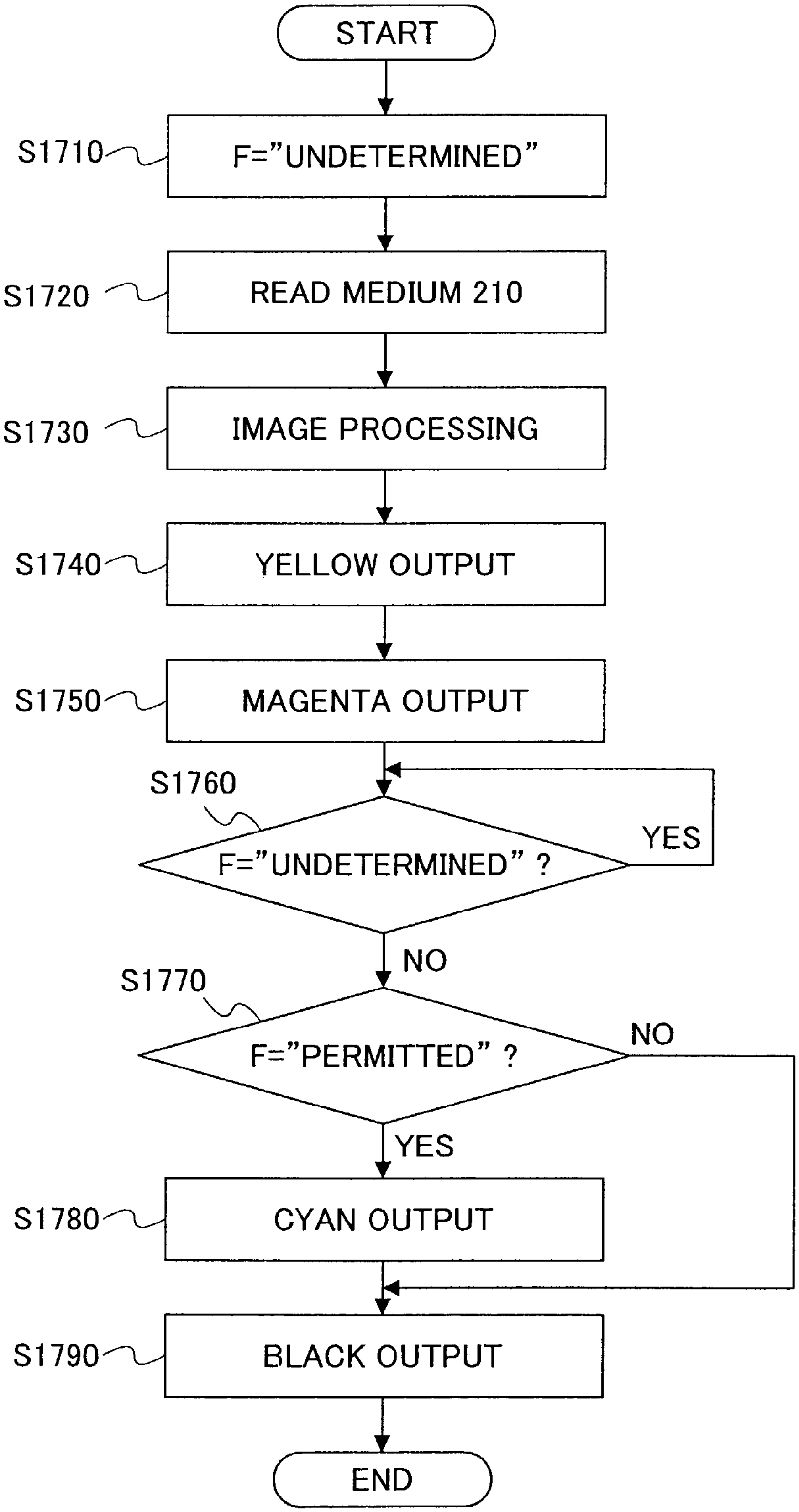
FIG. 17 is a flow chart showing the operation of the duplicating apparatus of the fifth embodiment of the present invention.

FIG. 17 illustrates the fourth duplication process. In the duplication process shown in FIG. 13, for example, in a duplicating apparatus able to output cyan (simply abbreviated as "C"), magenta (abbreviated as "M"), yellow (abbreviated as "Y"), and black (abbreviated as "B") colors, when recording color images as the image data to a medium of a data recording medium acting as a copy destination, if it is confirmed that recording is permitted in the above determination process, the recorder 23 records the image data to the medium of the copy destination, whereas if it is confirmed that recording is not permitted in the above determination process, the recorder 23 records any three colors among cyan, magenta, yellow, and black colors to the medium of the copy destination.

In step S1710, the status variable F is initialized by assigning F a value of "undetermined".

In step S1720, the first reader 20 reads the image data from the data recording medium 200.

In step S1730, image processing for the image data is performed in order to record the image data, for example, the image processing includes necessary corrections to the image data, scaling-up or scaling-down of the image data.

In step S1740, the recorder 23 records the yellow color to the medium of the data recording medium acting as the copy destination.

In step S1750, the recorder 23 records the magenta color to the medium of the same data recording medium.

In step S1760, the determination unit 25 ascertains if the value of the status variable F is "undetermined". If the value of F is "undetermined", the routine waits until F is assigned a value other than "undetermined".

The routine proceeds to step S1370 when F is assigned a value other than "undetermined".

In step S1770, the determination unit 25 ascertains if the value of the status variable F is "permitted".

If the value of F is "permitted", the routine proceeds to step S1780.

If the value of F is not "permitted", the routine proceeds to step S1790 without the cyan data being recorded to the medium of the destination data recording medium, nor the control data being recorded to the data storage unit of the destination data recording medium.

In step S1780, the recorder 23 records the cyan data to the medium of the destination data recording medium, and at the same time, the writer 24 writes the control data to the data storage unit of the destination data recording medium.

In step S1790, the recorder 23 records the black data to the medium of the destination data recording medium.

Note that step S1760 and step S1770 may be performed at any time after step S1710 and before step S1790.

Above, explanations are made of the case in which the first reader 20 and the second reader 21 read the image data and the control data at the same time. Next, an explanation is made of the case in which the first reader 20 reads the image data after the second reader 21 reads the control data.

FIG. 12 is a flow chart illustrating such a case.

In step S1210, the second reader 21 reads the control data from the data recording medium 200.

In step S1220, depending on whether reading of the control data is successful or not, the determination unit 25 confirms if the data storage unit 220 is available. If the data storage unit 220 is available, the routine proceeds to step S1230, whereas if the data storage unit 220 is not available (the data storage unit 220 does not exist), the routine proceeds to step S1250.

In step S1230, the determination unit 25 analyzes the data storage unit 220, that is, the determination unit 25 analyzes the control data in the data storage unit 220.

In step S1240, based on the recording permission data included in the control data, the determination unit 25 confirms whether recording the image data to a destination data recording medium is permitted. If recording is permitted, the routine proceeds to step S1250, whereas if recording is not permitted, the routine ends.

In step S1250, the first reader 20 reads the image data from the data recording medium 200.

In step S1260, image processing for the image data is performed in order to record the image data, for example, the image processing includes necessary corrections to the image data, scaling-up or scaling-down of the image data.

In step S1270, the recorder 23 records the image data to a medium of a data recording medium acting as a copy destination, and at the same time, the writer 24 writes the control data to the data storage unit of the same data recording medium.

According to the duplicating apparatus of the present embodiment, it is possible to control the operations of the recorder 23 and the writer 24 based on the determination made by the determination unit 25, therefore, enabling prevention of forgery of the data recording medium 200.

Sixth Embodiment

Figure 18:
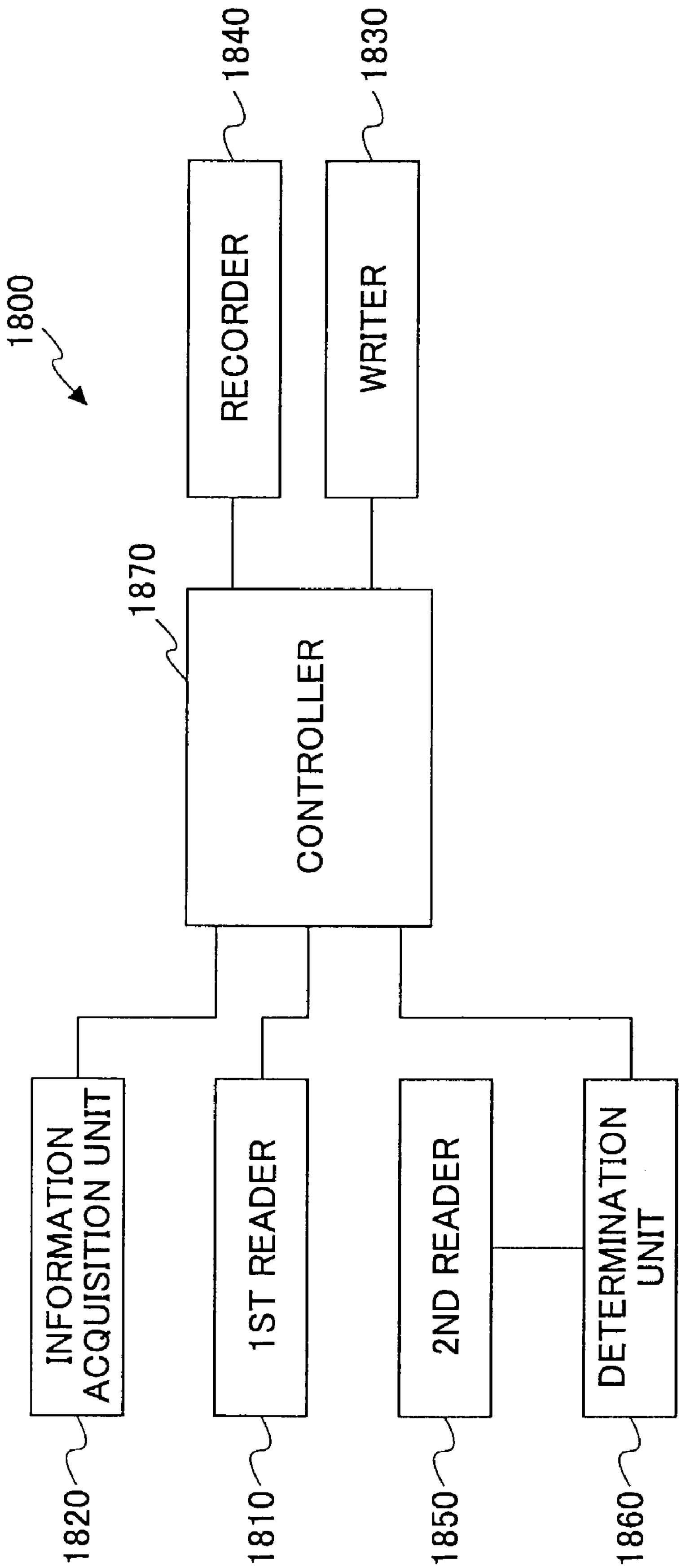
FIG. 18 is a block diagram of the configuration of an image forming apparatus according to a sixth embodiment of the present invention.

FIG. 18 is a block diagram of the configuration of an image forming apparatus 1800 according to the sixth embodiment of the present invention. The image forming apparatus 1800 may be a copier, a facsimile machine, a scanner, or an apparatus combining all of them.

The image forming apparatus 1800 includes a first reader 1810, an information acquisition unit 1820, a writer 1830, a recorder 1840, a second reader 1850, a determination unit 1860, and a controller 1870.

The image forming apparatus 1800 reads the image data and the control data in the data recording medium 200 as shown in FIG. 1. In the present embodiment, the medium 210 in the data recording medium 200 is a manuscript, thus the data recording medium 200 includes the manuscript and a data storage unit 220. The data storage unit 220 is a monolithic RFID chip. Further, images are recorded on the manuscript 210, and control data are stored in the data storage unit 220. For example, in the present embodiment, the recording permission data mentioned above are stored in the data storage unit 220.

The first reader 1810 reads image data from the manuscript 210 of the data recording medium 200.

The information acquisition unit 1820 is adapted to acquire information concerning image reading, for example, date and time information, or device information, or user identification data, or position information.

Even though not shown in figures, the information acquisition unit 1820 may include a date and time information generator, a device information memory, a position detection unit, and an input portion.

The date and time information generator has a clock, and generates data of date and time when the information concerning image reading (or read information) is created. The device information memory stores the MAC (Media Access Address) of the image forming apparatus 1800. The position detection unit includes a GPS (Global Positioning System) receiver, and detects the position of the image forming apparatus 1800. The input portion includes a keyboard or other input device, and is used to input user ID number or other information.

The writer 1830 writes the information obtained by the information acquisition unit 1820 to the data storage unit 220.

The recorder 1840 records the image data read by the first reader 1810 from the original manuscript of the data recording medium 200 to a manuscript of another data recording medium. Here, this data recording medium acts as a copy destination, as shown in FIG. 1; it may include a manuscript embedded with a data storage unit.

The second reader 1850 reads control data from the data storage unit 220. For example, the control data include recording permission data.

The determination unit 1860, based on the recording permission data obtained by the second reader 1850, confirms if recording the image data is permitted.

The controller 1870 controls the recorder 1840 and the writer 1830 according to the determination made by the determination unit 1860. When the determination unit 1860 ascertains that recording the image data to other manuscripts is not permitted, the controller 1870 directs the writer 1830 to write the read information to the data storage unit 220.

Next, the operation of the image forming apparatus of the present embodiment is explained below.

Figure 19:
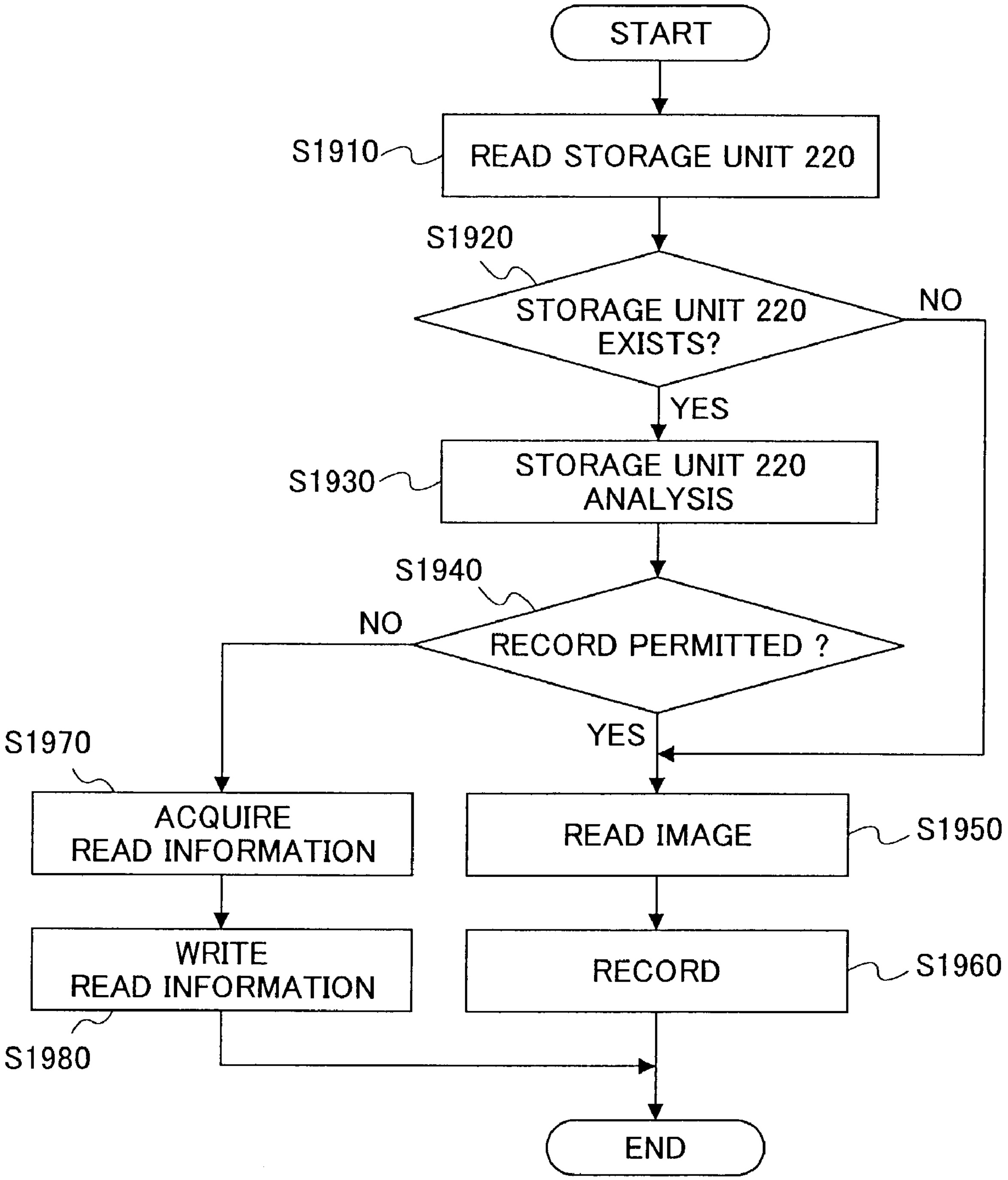
FIG. 19 is a flow chart showing the operation of the image forming apparatus of the sixth embodiment of the present invention.

FIG. 19 is a flow chart showing the operation of the image forming apparatus 1800 of the present embodiment.

In step S1910, the second reader 1850 reads the control data from the data storage unit 220 of the data recording medium 200. The control data include record permission data that permits or forbids recording image data stored in the data recording medium 200.

In step S1920, depending on whether reading of the control data is successful or not, the determination unit 1860 confirms if the data storage unit 220 is available. If the data storage unit 220 is available, the routine proceeds to step S1930, whereas if the data storage unit 220 is not available (that is, the data storage unit 220 does not exist), the routine proceeds to step S1950.

In step S1930, the determination unit 1860 analyzes the data storage unit 220, that is, the determination unit 1860 analyzes the control data in the data storage unit 220.

In the step S1940, based on the recording permission data included in the control data, the determination unit 1860 confirms whether recording the image data to a destination data recording medium is permitted. If recording of the image data is permitted, the routine proceeds to step S1950, whereas if recording of the image data is not permitted, the routine proceeds to step S1970.

In step S1950, the first reader 1810 reads the image data from the data recording medium 200.

In step S1960, the recorder 1840 records the image data to the destination manuscript.

In step S1970, the information acquisition unit 1820 obtains the read information.

In step S1980, the writer 1830 writes the read information to the data storage unit 220 of the data recording medium 200, and the processing is completed.

According to the image forming apparatus of the present embodiment, read information is written to the data storage unit 220 by the writer 1830 when it is confirmed that recording image data are not permitted by the determination unit 1860. This allows a later follow-up survey, and thereby, prevention of forgery of the data recording medium 200.

Seventh Embodiment

Figure 20:
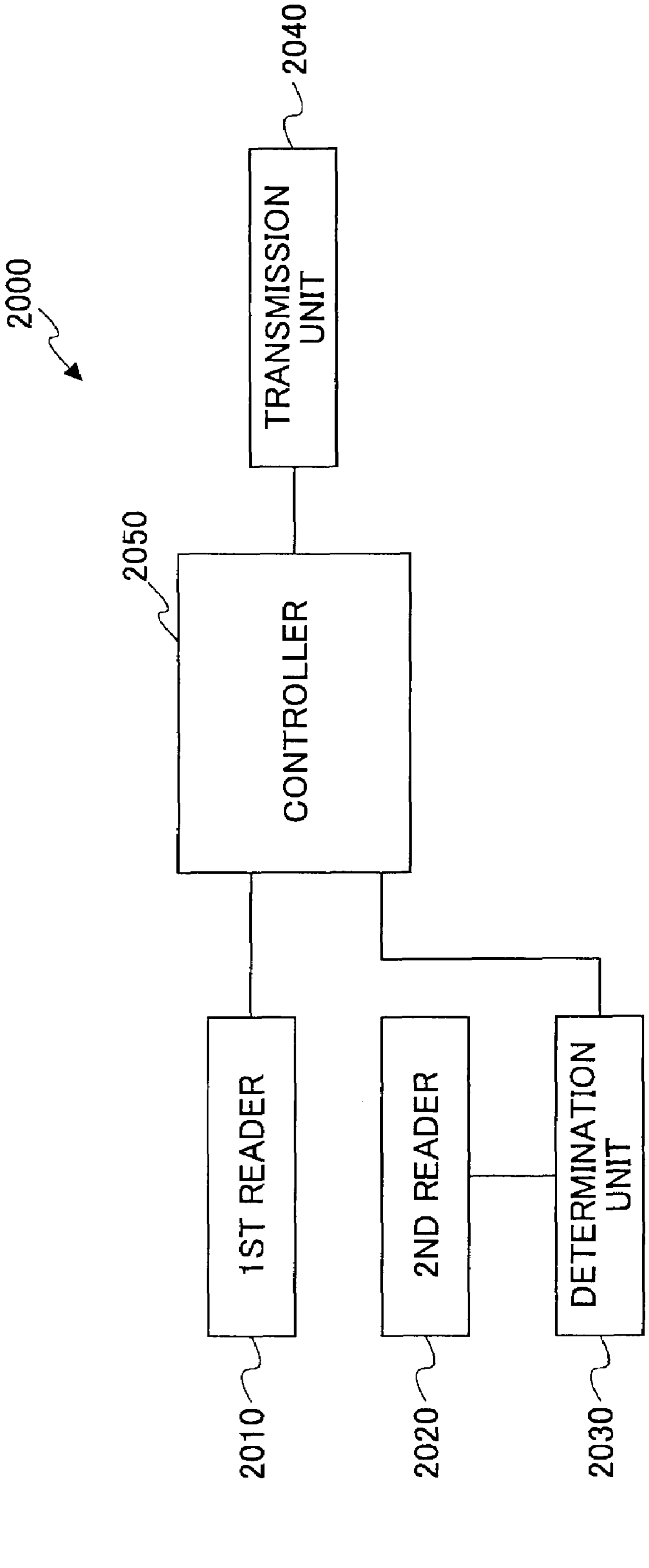
FIG. 20 is a block diagram of the configuration of an image forming apparatus according to a seventh embodiment of the present invention.

FIG. 20 is a block diagram of the configuration of an image forming apparatus 2000 according to the seventh embodiment of the present invention. The image forming apparatus 2000 may be a copier, a facsimile machine, a scanner, or an apparatus combining all of them.

The image forming apparatus 2000 includes a first reader 2010, a second reader 2020, a determination unit 2030, a transmission unit 2040, and a controller 2050.

The image forming apparatus 2000 reads the image data and the control data in the data recording medium 200 as shown in FIG. 1. In the present embodiment, the medium 210 in the data recording medium 200 is a manuscript, thus the data recording medium 200 includes the manuscript and a data storage unit 220. The data storage unit 220 is a monolithic RFID chip. Further, images are recorded on the manuscript 210, and control data are stored in the data storage unit 220. For example, in the present embodiment, the control data includes information of the images on the manuscript, the recording permission data mentioned above, and other specified information. For example, the specified information includes identification data indicating the manuscript is a securities document or a bill, and is stored in the data storage unit 220 beforehand.

The first reader 2010 reads image data from the manuscript 210 of the data recording medium 200.

The second reader 2020 reads control data from the data storage unit 220.

The determination unit 2030 confirms if the specified information is included in the control data obtained by the second reader 2020.

The transmission unit 2040 is connected to a network, and transmits the control data in the data storage unit 220 to a not-illustrated peripheral device. The peripheral device may be a monitoring PC (personal computer) of a watchdog agency for forgery surveillance, for example, the police. Further, the peripheral device is configured to be able to analyze the control data transmitted from the image forming apparatus 2000 and identify invalid reading of the image data in the manuscript 210. Moreover, if the data recording medium 200 is paper money (bills), circulation of the paper money may be blocked by using the bill numbers included in the control data stored in the data storage unit 220.

The controller 2050 controls the transmission unit 2040 according to the determination made by the determination unit 2030. When the determination unit 2030 ascertains that the specified data are included in the control data, the controller 2050 directs the transmission unit 2040 to transmit the control data stored in the data storage unit 220 to the peripheral device.

Next, the operation of the image forming apparatus 2000 of the present embodiment is explained below.

Figure 21:
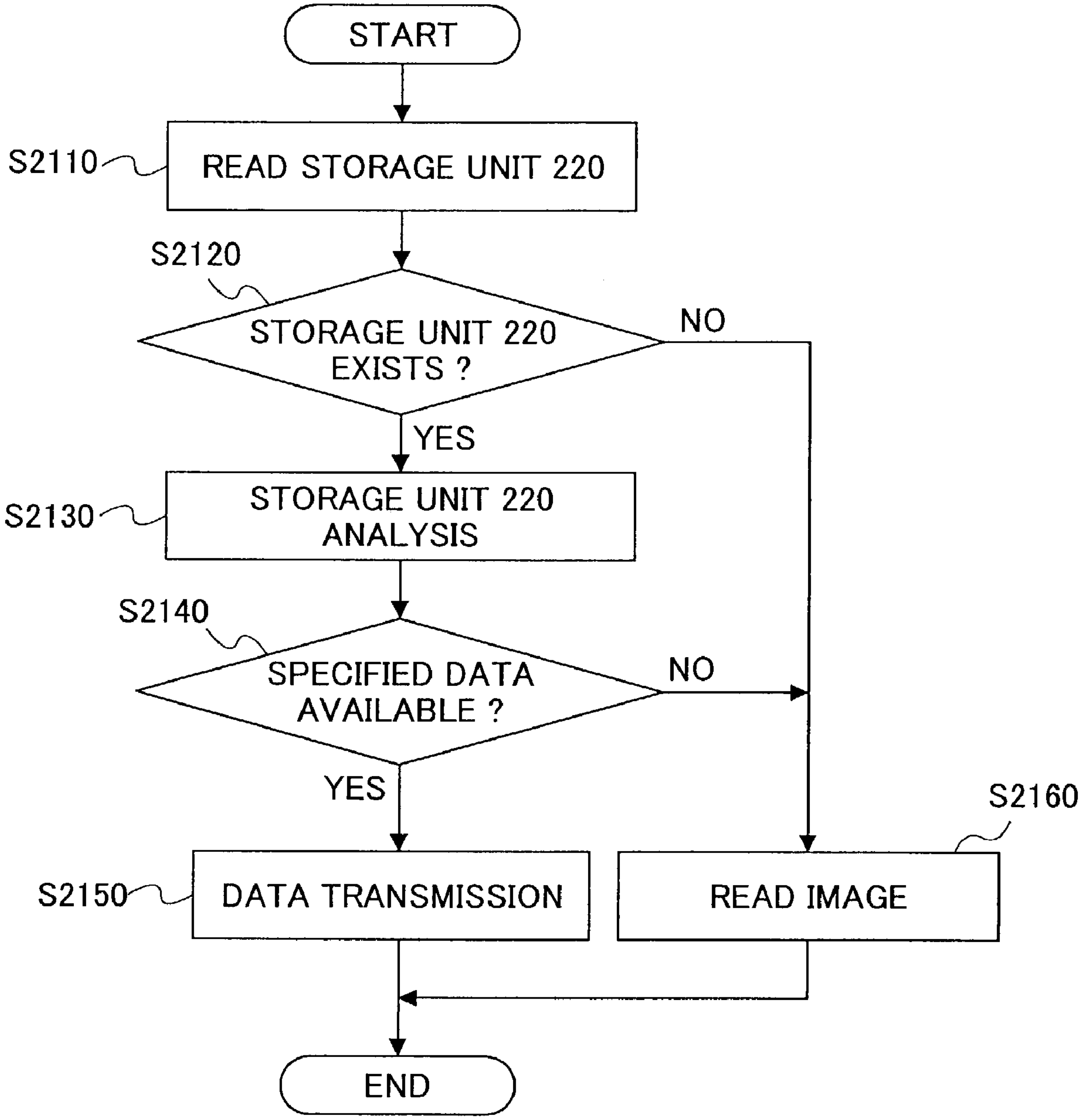
FIG. 21 is a flow chart showing the operation of the image forming apparatus of the seventh embodiment of the present invention.

FIG. 21 is a flow chart showing the operation of the image forming apparatus 2000 of the present embodiment.

In step S2110, the second reader 2020 reads the control data from the data storage unit 220 of the data recording medium 200. The control data include recording permission data that permits or forbids recording image data stored in the data recording medium 200.

In step S2120, depending on whether reading of the control data is successful or not, the determination unit 2030 determines if the data storage unit 220 is available. If the data storage unit 220 is available, the routine proceeds to step S2130, whereas if the data storage unit 220 is not available (that is, the data storage unit 220 does not exist), the routine proceeds to step S2160.

In step S2130, the determination unit 2030 analyzes the data storage unit 220, that is, the determination unit 2030 analyzes the control data in the data storage unit 220.

In step S2140, the determination unit 2030 confirms if specified data are included in the control data. If specified data are included in the control data, the routine proceeds to step S2150, whereas if specified data are not included in the control data, the routine proceeds to step S2160.

In step S2150, the transmission unit 2040 transmits the control data in the data storage unit 220 to the peripheral device.

In step S2160, the first reader 2110 reads the image data from the data recording medium 200.

According to the image forming apparatus 2000 of the present embodiment, when the determination unit 2030 confirms the specified data are included in the control data, the transmission unit 2040 transmits the control data in the data storage unit 220 to the peripheral device, and therefore, it is possible to inform others of the invalid reading, and thus allows prevention of forgery of the data recording medium 200.

Eighth Embodiment

Figure 22:
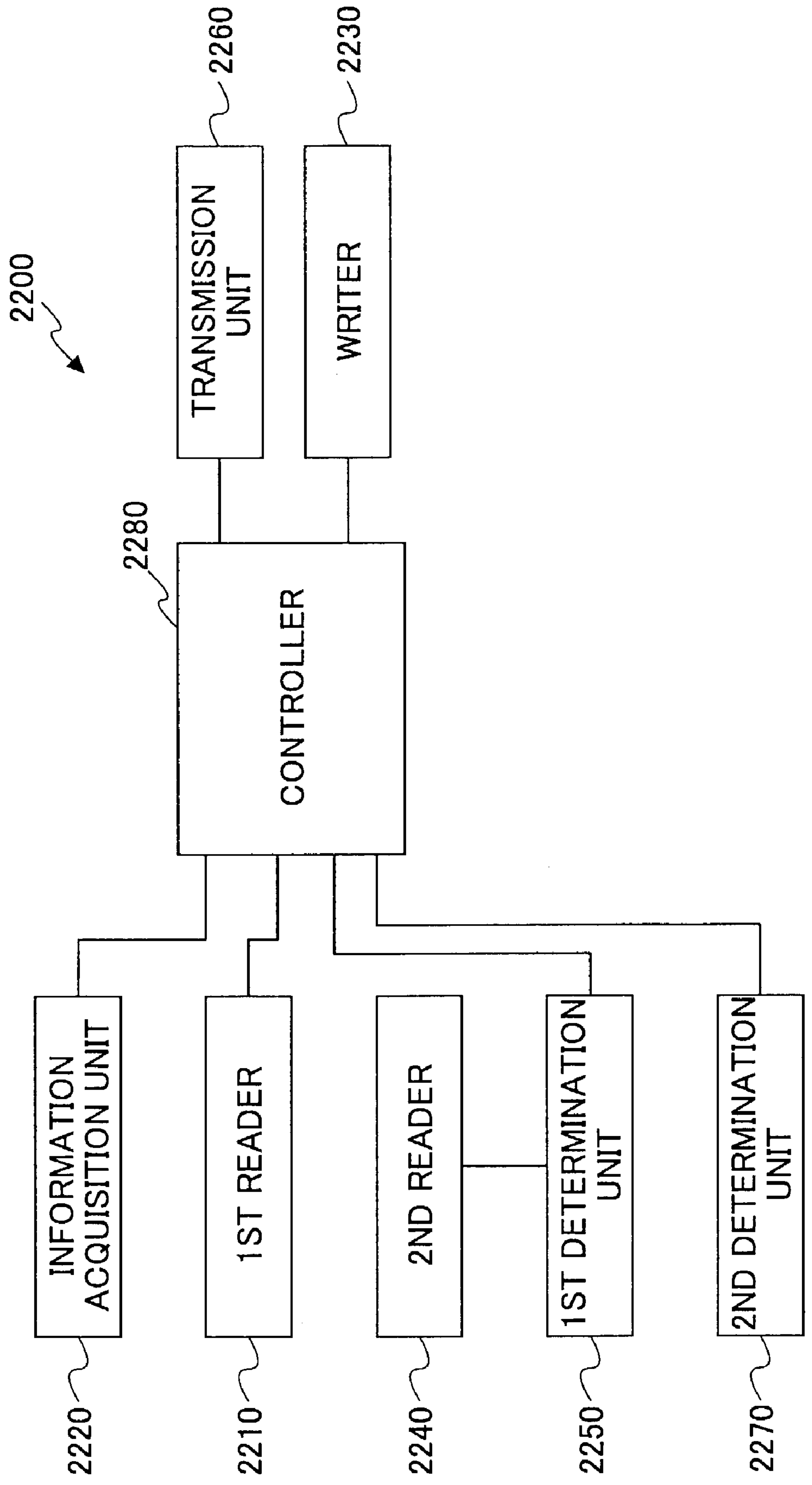
FIG. 22 is a block diagram of the configuration of an image forming apparatus according to an eighth embodiment of the present invention.

FIG. 22 is a block diagram of the configuration of an image forming apparatus 2200 according to the eighth embodiment of the present invention. The image forming apparatus 2200 may be a copier, a facsimile machine, a scanner, or an apparatus combining all of them.

The image forming apparatus 2200 includes a first reader 2210, an information acquisition unit 2220, a writer 2230, a second reader 2240, a first determination unit 2250, a transmission unit 2260, a second determination unit 2270, and a controller 2280.

The image forming apparatus 2200 reads the image data and the control data in the data recording medium 200 as shown in FIG. 1. In the present embodiment, the medium 210 in the data recording medium 200 is a manuscript, thus the data recording medium 200 includes the manuscript and a data storage unit 220. The data storage unit 220 is a monolithic RFID chip. Further, images are recorded on the manuscript 210, and control data are stored in the data storage unit 220. For example, in the present embodiment, the control data include information of the images on the manuscript, the recording permission data mentioned above, and other specified information. For example, the specified information includes identification data indicating the manuscript is a securities document or a bill, and is stored in the data storage unit 220 beforehand.

The first reader 2010 reads image data from the manuscript 210 of the data recording medium 200.

The information acquisition unit 2220 is adapted to acquire information concerning image reading, for example, date and time information, or device information, or user identification data, or position information.

Even though not shown in figures, the information acquisition unit 2220 may include a date and time information generator, a device information memory, a position detection unit, and an input portion.

The date and time information generator has a clock, and generates data of date and time when the information concerning image reading (or read information) is created. The device information memory stores the MAC (Media Access Address) of the image forming apparatus 2200. The position detection unit includes a GPS (Global Positioning System) receiver, and detects the position of the image forming apparatus 1800. The input portion includes a keyboard or other input device, and is used to input user ID number or other information.

The writer 2230 writes the information obtained by the information acquisition unit 2220 to the data storage unit 220.

The second reader 2240 reads control data from the data storage unit 220.

The first determination unit 2250 confirms if the specified information is included in the control data obtained by the second reader 2240.

The transmission unit 2260 is connected to a network, and transmits the control data in the data storage unit 220 to a not-illustrated peripheral device. The peripheral device may be a monitoring PC (personal computer) of a watchdog agency for forgery surveillance, for example, the police. Further, the peripheral device is configured to be able to analyze the control data transmitted from the image forming apparatus 2000 and identify invalid reading of the image data in the manuscript 210. Moreover, if the data recording medium 200 is paper money (bills), circulation of the paper money may be blocked by using the bill numbers included in the control data stored in the data storage unit 220.

The second determination unit 2270 confirms if transmission of the specified information by the transmission unit 2260 is possible, in other words, the second determination unit 2270 confirms the connection condition of the transmission unit 2260 with the network using PING or other methods.

The controller 2280 controls the transmission unit 2260 and the writer 2230 according to the determination made by the second determination unit 2270. When the second determination unit 2270 ascertains that transmission is possible, the controller 2280 directs the transmission unit 2260 to transmit the control data and read information stored in the data storage unit 220 to the peripheral device; when the second determination unit 2270 ascertains that transmission is not possible, the controller 2280 directs the writer 2230 to write the read information to the data storage unit 220.

Next, the operation of the image forming apparatus 2200 of the present embodiment is explained below.

Figure 23:
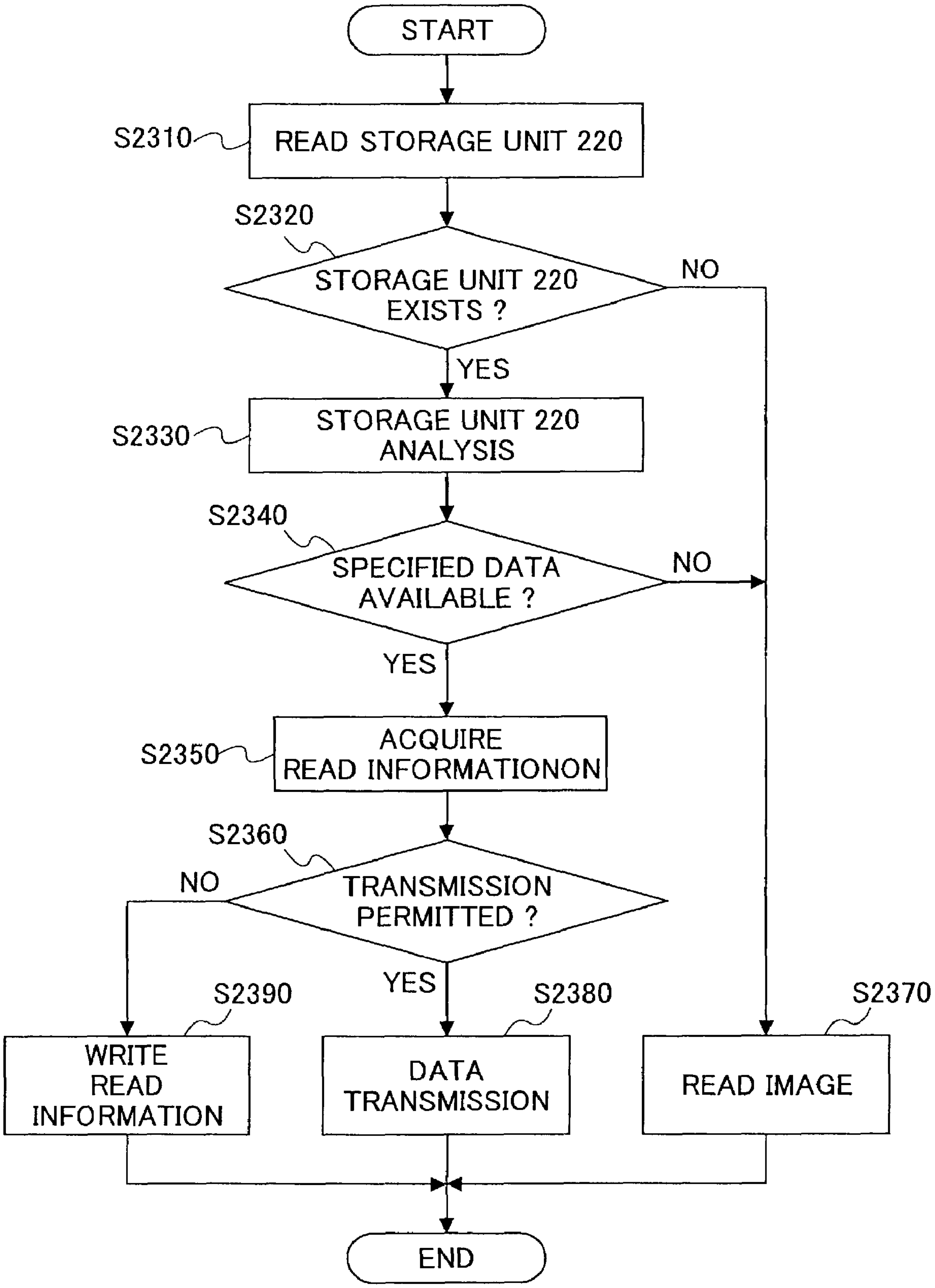
FIG. 23 is a flow chart showing the operation of the image forming apparatus of the eighth embodiment of the present invention.

FIG. 23 is a flow chart showing the operation of the image forming apparatus 2200 of the present embodiment.

In step S2310, the second reader 2240 reads the control data from the data storage unit 220 of the data recording medium 200. The control data include record permission data that permits or forbids recording image data stored in the data recording medium 200.

In step S2320, depending on whether reading of the control data is successful or not, the first determination unit 2250 determines if the data storage unit 220 is available. If the data storage unit 220 is available, the routine proceeds to step S2330, whereas if the data storage unit 220 is not available (that is, the data storage unit 220 does not exist), the routine proceeds to step S2370.

In step S2330, the first determination unit 2250 analyzes the data storage unit 220, that is, the first determination unit 2250 analyzes the control data in the data storage unit 220.

In step S2340, the first determination unit 2250 confirms if specified data are included in the control data. If the specified data are included in the control data, the routine proceeds to step S2350, whereas if the specified data are not included in the control data, the routine proceeds to step S2360.

In step S2350, the information acquisition unit 2220 obtains the read information.

In step S2360, the second determination unit 2270 confirms if transmission of the specified data and the read information stored in the data storage unit 220 by the transmission unit 2260 is possible. When the second determination unit 2270 confirms transmission of the specified data and the read information stored in the data storage unit 220 by the transmission unit 2260 is possible, the routine proceeds to step S2380; when the second determination unit 2270 confirms transmission of the specified data and the read information stored in the data storage unit 220 by the transmission unit 2260 is not possible, the routine proceeds to step S2390.

In step S2370, the first reader 2210 reads the image data from the data recording medium 200.

In step S2380, the controller 2280 directs the transmission unit 2260 to transmit the control data and read information stored in the data storage unit 220 to the peripheral device.

In step S2390, the controller 2280 directs the writer 2230 to write the read information to the data storage unit 220.

According to the image forming apparatus 2200 of the present embodiment, when the second determination unit 2270 confirms transmission of the specified information and the read information by the transmission unit 2260 is possible, the controller 2280 directs the transmission unit 2260 to transmit the control data and read information stored in the data storage unit 220 to the peripheral device; when the second determination unit 2270 confirms transmission of the specified information and the read information by the transmission unit 2260 is not possible, the controller 2280 directs the writer 2230 to write the read information to the data storage unit 220. Therefore, although it is not possible to inform others of invalid reading of image data from the data storage unit 220 when the transmission unit 2260 is not connected with the network, if the person, who committed the invalid reading of the image data, uses the data recording medium 200 having the data storage unit 220 in an ATM (Automated Telling Machine) of a bank or a vendor machine capable of communication, the read information stored in the data storage unit 220 is transmitted to inform others of the invalid reading of the image data in the data recording medium 200, and thereby, it allows prevention of forgery of the data recording medium 200.

In the first through eighth embodiments, explanations are made with a document having a built-in data storage unit as an example. The present invention may also be applied to a book having a built-in data storage unit as described below in the ninth through 12th embodiments.

Figure 32A:
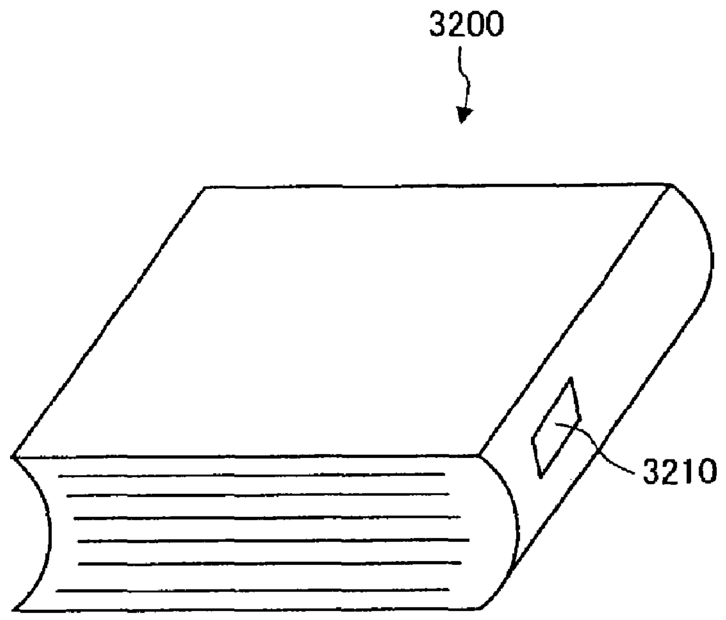
FIGS. 32A and 32B are a perspective view of a book applicable to the image forming apparatuses according to the ninth through 12th embodiments of the present invention, and a front view of a portion of the book, respectively.
Figure 32B:
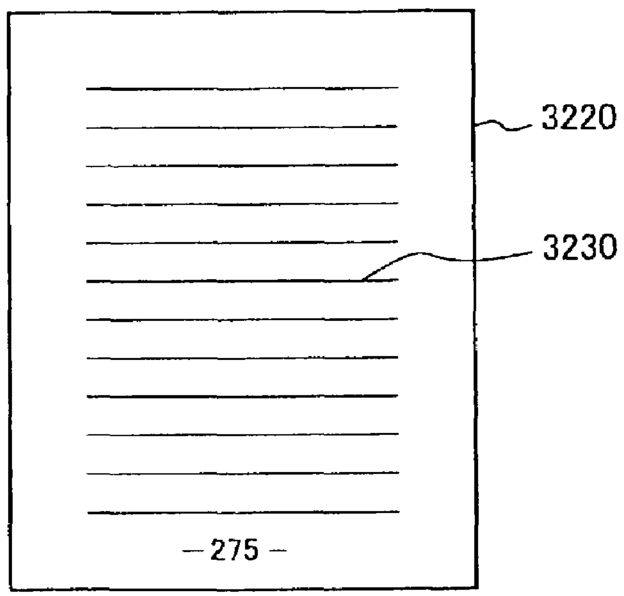

FIGS. 32A and 32B are a perspective view of a book applicable to the image forming apparatuses of the ninth through 12th embodiments of the present invention, and a front view of a portion of the book, respectively.

FIG. 32A shows a book 3200 with a data storage unit 3210 attached to the back cover thereof.

The data storage unit 3210 includes a not-illustrated antenna coil to receive electromagnetic energy and receive and transmit data, and a RFID (Radio Frequency Identification) chip obtained by combining a memory and an ASIC (Application Specific Integrated Circuit) into a single chip.

By the antenna coil, the data storage unit 3210 receives electromagnetic waves transmitted from reading devices and writing devices described in the ninth through 12th embodiments, and generates necessary electrical power from the received electromagnetic waves to perform read or write operations according to commands or data carried in the electromagnetic waves received by the data storage unit 3210.

The data storage unit 3210 is attached to the book 3200, for example, the data storage unit 3210 may be embedded or pasted in the cover of the book 3200. In the data storage unit 3210, as described below, encrypted number of times of reading, limit to the number of times of reading, read data, image reading information and copyright information are stored or written.

FIG. 32B shows one page 3220 of the book 3200, in which image 3230 including letters, patterns, and pictures.

Ninth Embodiment

Figure 24:
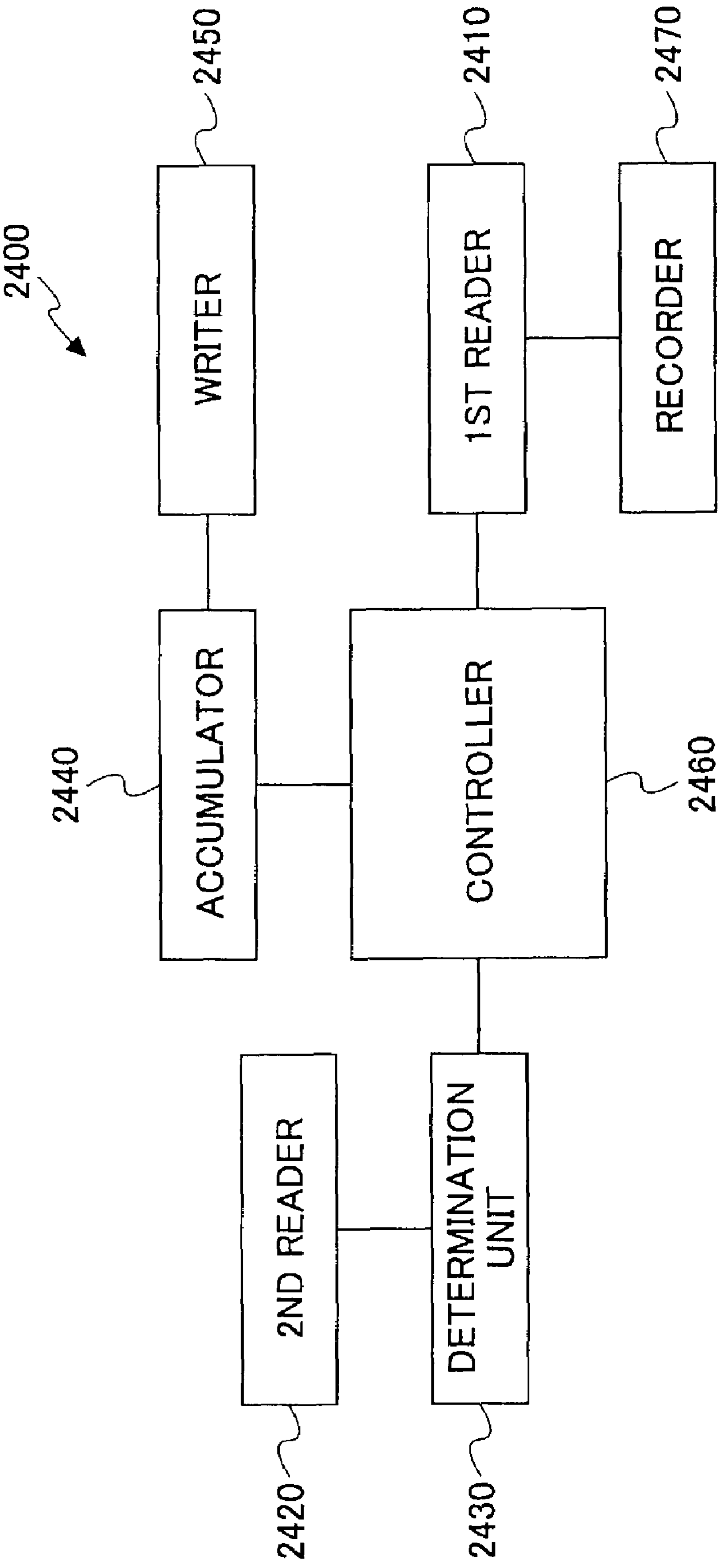
FIG. 24 is a block diagram of the configuration of an image forming apparatus according to a ninth embodiment of the present invention.

FIG. 24 is a block diagram of the configuration of an image forming apparatus 2400 according to the ninth embodiment of the present invention.

The image forming apparatus 2400 includes a first reader 2410, a second reader 2420, a determination unit 2430, an accumulator 2440, a writer 2450, a controller 2460, and a recorder 2470.

The first reader 2410, for example, is a scanner, and reads image data from the book 3200.

The second reader 2420 reads control data from the data storage unit 3210 in the book 3200. For example, the second reader 2420 reads the number of times (NT) that images in the book 3200 have already been read so far, and the allowed limit to the number of times (LNT) that images in the book 3200 can be read.

The determination unit 2430 is connected to the second reader 2420, and compares the number of times of reading (NT) with the limit number of times of reading (LNT) obtained by the second reader 2420, to determine if the number of times of reading is less than the limit to the number of times of reading.

The controller 2460 includes a CPU (Central Processing Unit); it is connected to the first reader 2410 and the determination unit 2430, and controls the first reader 2410 according to the determination made by the determination unit 2430. When the determination unit 2430 ascertains that the number of times of reading is less than the limit to the number of times of reading, the controller 2460 directs the first reader 2410 to read images in the book 3200; whereas when the number of times of reading is not less than the limit to the number of times of reading, the controller 2460 prohibits the first reader 2410 from reading the images in the book 3200. Note that the controller 2460 need not be integral with the image forming apparatus 2400; a usual PC (Personal Computer) may be used as the controller 2460 in connection with the image forming apparatus 2400.

The accumulator 2240 increments the number of times of reading by one each time the first reader 2410 reads image from the book 3200.

The writer 2450 writes the updated number of times of reading by the accumulator 2240 to the data storage unit 3210 of the book 3200.

The recorder 2470 records the image data obtained by the first reader 2410 to a destination recording medium. The destination recording medium, for example, is paper of a book.

Next, the operation of the image forming apparatus 2400 of the present embodiment is explained below.

Figure 25:
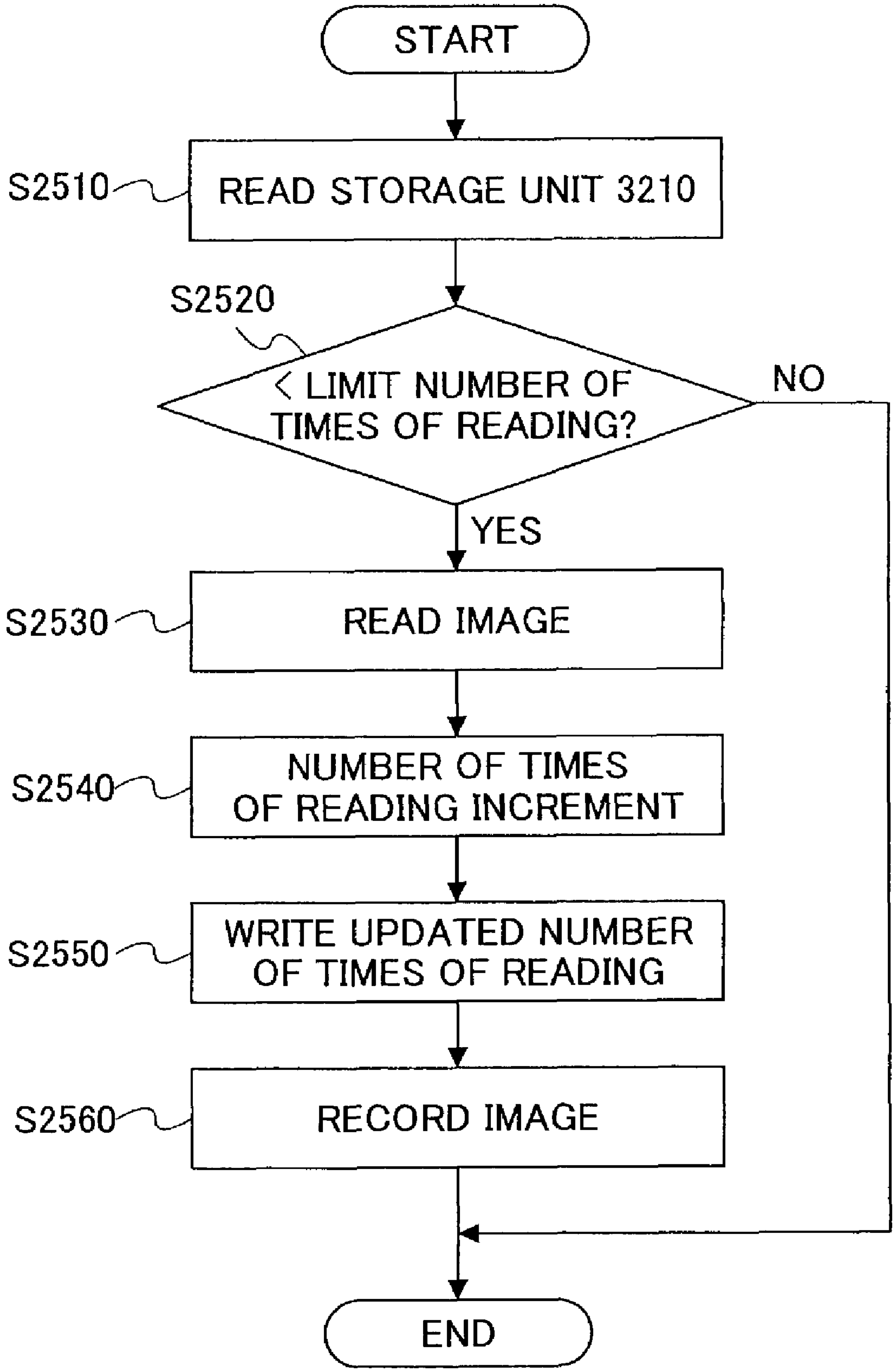
FIG. 25 is a flow chart showing the operation of the image forming apparatus of the ninth embodiment of the present invention.

FIG. 25 is a flow chart showing the operation of the image forming apparatus 2400 of the present embodiment.

In step S2510, the second reader 2420 reads the control data from the data storage unit 3210 of the book 3200. The control data include the number of times that images in the book 3200 have been read so far, and the limit to the number of times of reading the images in the book 3200.

In step S2520, the determination unit 2430 compares the number of times of reading with the limit number of times of reading obtained by the second reader 2420, and determines if the number of times of reading is less than the limit number of times of reading. If the determination unit 2430 determines that the number of times of reading is less than the limit number of times of reading, the routine proceeds to step S2530, whereas if the determination unit 2430 determines that the number of times of reading is not less than the limit number of times of reading, the routine ends.

In step S2530, the first reader 2410 reads the image data from the book 3200.

In step S2540, the accumulator 2240 increases by one the number of times that the images of the book 3200 have been read.

In step S2550, the controller 2460 directs the writer 2450 to write the number of times of reading updated by the accumulator 2240 to the data storage unit 3210 of the book 3200.

In step S2560, the controller 2460 directs the recorder 2470 to record the image data obtained by the first reader 2410 to the destination recording medium.

According to the image forming apparatus 2400 of the present embodiment, based on the number of times that the images in the book 3200 have been read and the limit number of times of reading the images in the book 3200, it is possible to control the number of times that the first reader 2410 reads the images in the book 3200, and thereby, prevent invalid copying of the book 3200.

10th Embodiment

Figure 26:
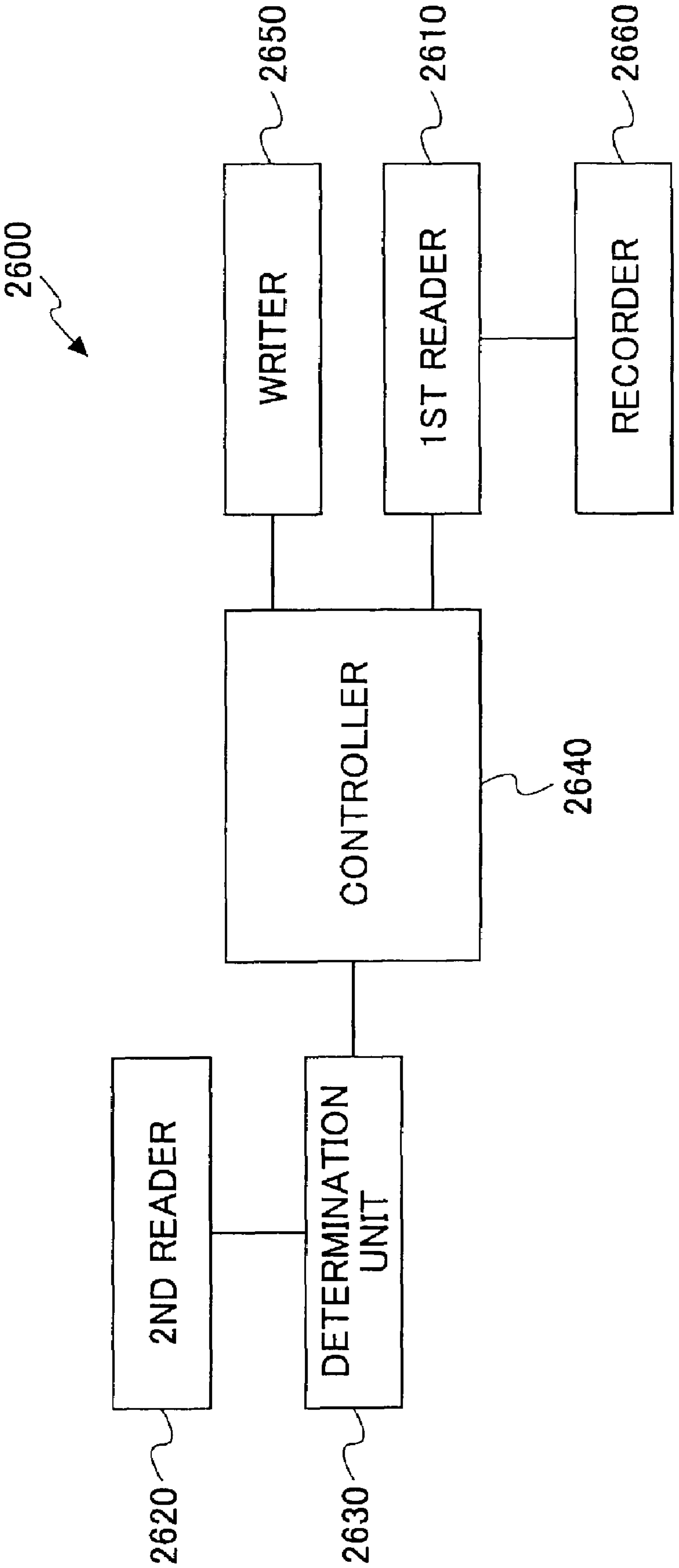
FIG. 26 is a block diagram of the configuration of an image forming apparatus according to a 10th embodiment of the present invention.

FIG. 26 is a block diagram of the configuration of an image forming apparatus 2600 according to the 10th embodiment of the present invention.

The image forming apparatus 2600 includes a first reader 2610, a second reader 2620, a determination unit 2630, a controller 2640, a writer 2650, and a recorder 2660.

The first reader 2610, for example, is a scanner, and reads image data from the book 3200.

The second reader 2620 reads control data from the data storage unit 3210 in the book 3200. For example, the control data includes read history information, more specifically, information of devices that have read the images in the book 3200 so far. The read history information may include the MAC (Media Access Address) of a PC (Personal Computer) that controls the devices.

The writer 2650 acquires information of reading images in the book 3200 (image read information), and writes the acquired image read information to the data storage unit 3210 of the book 3200. Here, for example, the image read information includes information of a device that is to read images of the book 3200, more specifically, it may be the MAC of a PC (Personal Computer) that controls the device. Additionally, the image read information may further include user data, date and time, and locations.

The recorder 2630 records the image data obtained by the first reader 2610 to a destination recording medium. The destination recording medium, for example, is paper of a book.

The determination unit 2630 determines if the read history information is obtained by the second reader 2620, in other words, the determination unit 2630 determines if the device information is included in the read history information obtained by the second reader 2620. Further, the determination unit 2630 determines if the book 3200 has a data storage unit 3210. In addition, the determination unit 2630 determines if the device information obtained by the second reader 2620 is consistent with the device information acquired by the writer 2650.

The controller 2640 includes a CPU (Central Processing Unit), and controls the writer 2650 and the recorder 2660 according to the determination made by the determination unit 2630.

If the determination unit 2630 confirms that the read history information is not obtained by the second reader 2620, the controller 2640 directs the writer 2650 to write the image read information to the data storage unit 3210 of the book 3200. Further, if the determination unit 2630 determines that the device information obtained by the second reader 2620 is consistent with the device information acquired by the writer 2650, the controller 2640 directs the first reader 2610 to read the image data from the book 3200. Further, if the determination unit 2630 determines that a data storage unit 3210 does not exist in the book 3200, the controller 2640 directs the first reader 2610 to read the image data from the book 3200. Note that the controller 2640 needs not be integral with the image forming apparatus 2600; a usual PC (Personal Computer) may be used as the controller 2640 in connection with the image forming apparatus 2600.

Next, the operation of the image forming apparatus 2600 of the present embodiment is explained below.

Figure 27:
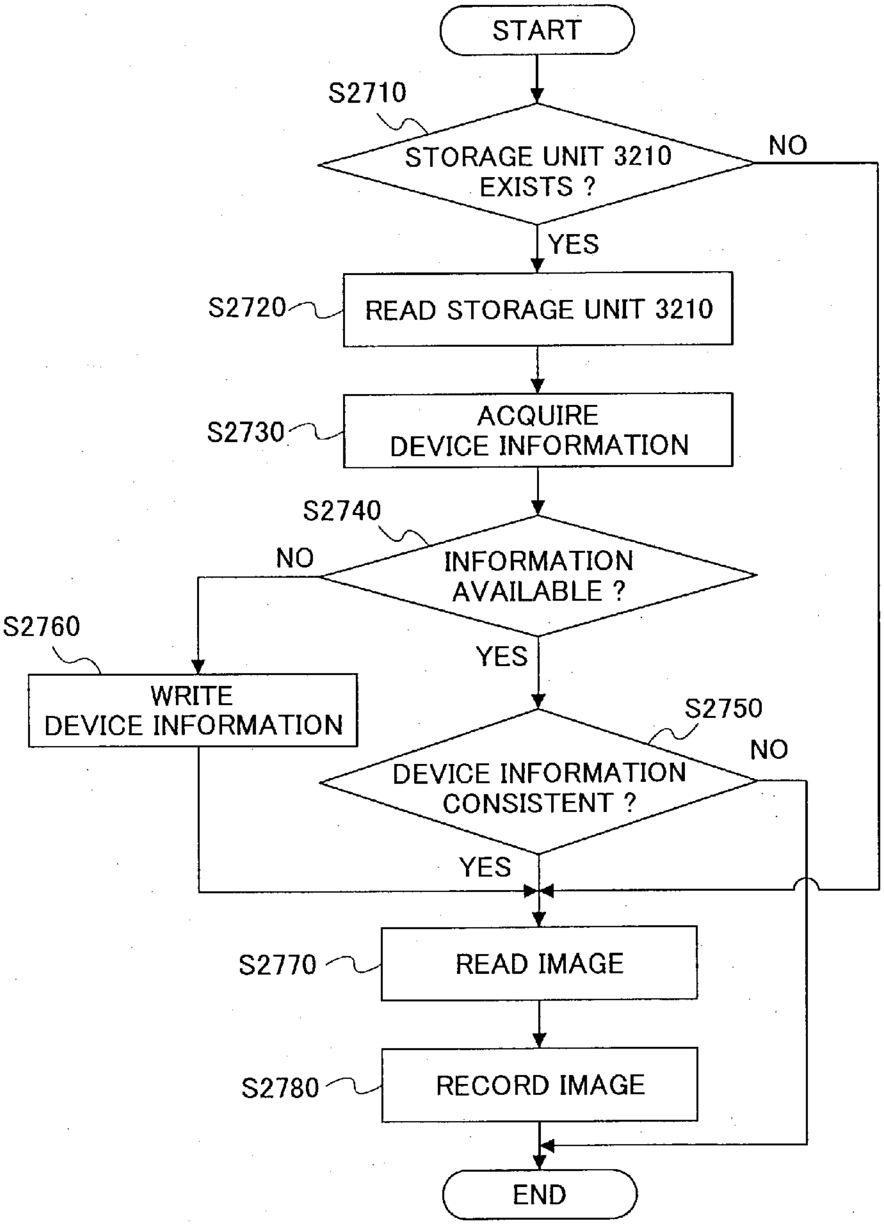
FIG. 27 is a flow chart showing the operation of the image forming apparatus of the 10th embodiment of the present invention.

FIG. 27 is a flow chart showing the operation of the image forming apparatus 2600 of the present embodiment.

In step S2710, the determination unit 2630 determines if the book 3200 has a data storage unit 3210. If the data storage unit 3210 exists, the routine proceeds to step S2720, whereas if the data storage unit 3210 does not exist, the routine proceeds to step S2770.

In step S2720, the second reader 2620 reads control data from the data storage unit 3210 in the book 3200. For example, the control data includes read history information, that is, information of devices that read the images in the book 3200 so far.

In step S2730, the writer 2650 acquires the image read information.

In step S2740, the determination unit 2630 determines if the read history information is obtained by the second reader 2620, in other words, the determination unit 2630 determines if the device information is included in the read history information obtained by the second reader 2620. If the determination unit 2630 confirms that the read history information is obtained by the second reader 2620, the routine proceeds to step S2750, whereas if the determination unit 2630 confirms that the read history information is not obtained by the second reader 2620, the routine proceeds to step S2760.

In step S2750, the determination unit 2630 determines if the device information obtained by the second reader 2620 is consistent with the device information acquired by the writer 2650. If the determination unit 2630 determines that the device information obtained by the second reader 2620 is consistent with the device information acquired by the writer 2650, the routine proceeds to step of S2770; while if the determination unit 2630 determines that the device information obtained by the second reader 2620 is not consistent with the device information acquired by the writer 2650, the routine ends.

In step S2760, the controller 2640 directs the writer 2650 to write the acquired image read information to the data storage unit 3210 of the book 3200.

In step S2770, the controller 2640 directs the first reader 2610 to read the image data from the book 3200.

In step S2780, the controller 2640 directs the recorder 2660 to record the image data obtained by the first reader 2610 to the destination recording medium.

According to the image forming apparatus 2600 of the present embodiment, while the images of a book can be digitized, if the read history information is not included in the data storage unit 3210, it is possible to write device information to the data storage unit 3210. As a result, when the digitized images are misused, it is possible to uniquely identify a device that committed the misuse, and thereby, enabling pursuit of the misuse.

11th Embodiment

Figure 28:
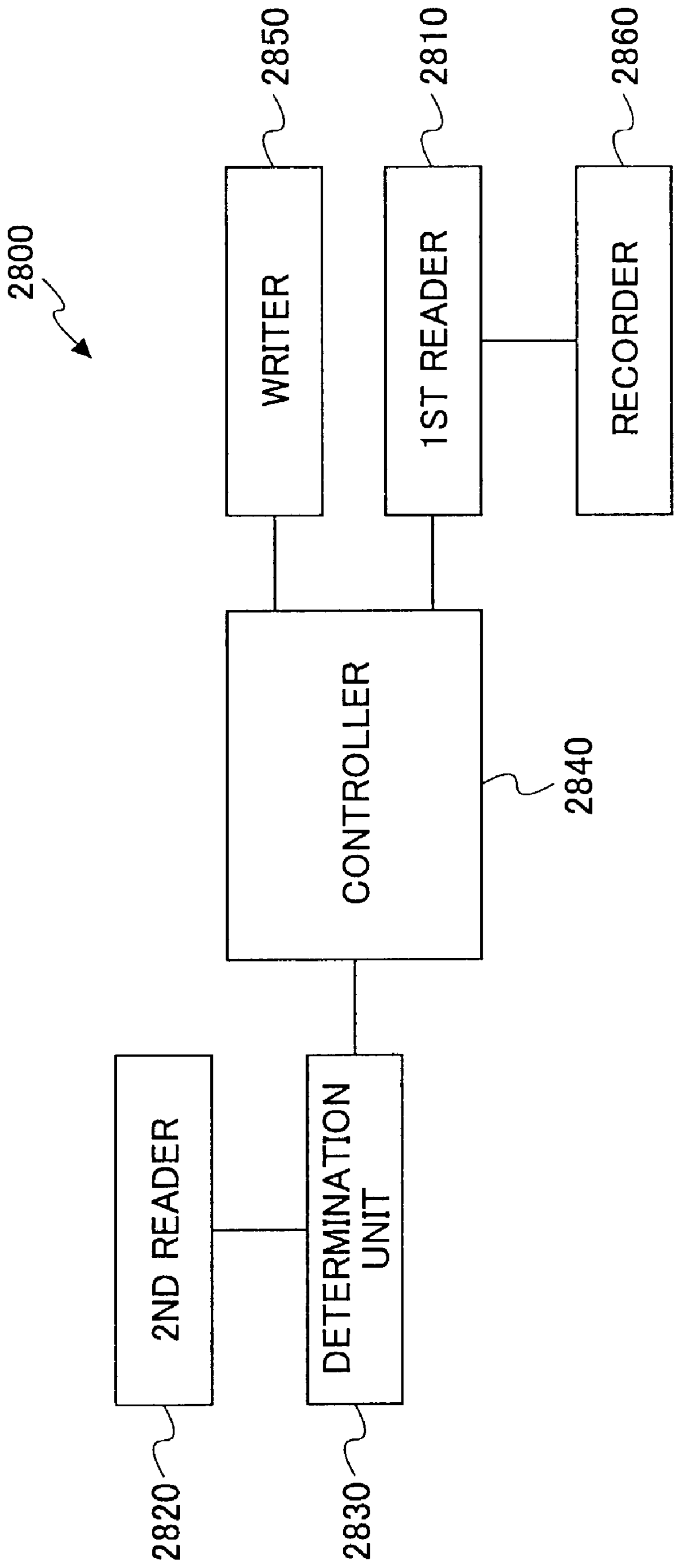
FIG. 28 is a block diagram of the configuration of an image forming apparatus according to an 11th embodiment of the present invention.

FIG. 28 is a block diagram of the configuration of an image forming apparatus 2800 according to the 11th embodiment of the present invention.

The image forming apparatus 2800 includes a first reader 2810, a second reader 2820, a determination unit 2830, a controller 2840, a writer 2850, and a recorder 2860.

The first reader 2810, for example, is a scanner, and reads image data from the book 3200.

The second reader 2820 reads control data from the data storage unit 3210 in the book 3200. For example, the control data includes read history information, more specifically, information of users who have read the images in the book 3200 so far. The user information may include various kinds of user identification numbers.

The writer 2850 acquires information of reading images of the book 3200 (image read information), and writes the acquired image read information to the data storage unit 3210 of the book 3200. Here, for example, the image read information is information of a user who is going to read images of the book 3200, and may be various kinds of user identification numbers. For example, users are required to input their passwords with a not-illustrated input device in order to use the device, and the writer 2850 accepts the input user information from the input device. Additionally, the image read information may further include data of date and time and locations.

The recorder 2860 records the image data obtained by the first reader 2810 to a destination recording medium. The destination recording medium, for example, is paper of a book.

The determination unit 2830 determines if the read history information is obtained by the second reader 2820, in other words, the determination unit 2830 determines if the user information is included in the read history information obtained by the second reader 2820. In addition, the determination unit 2630 determines if the user information obtained by the second reader 2820 is consistent with the user information acquired by the writer 2850.

The controller 2840 includes a CPU (Central Processing Unit), and controls the first reader 2810, the writer 2850 and the recorder 2860 according to the determination made by the determination unit 2830.

If the determination unit 2830 confirms that the read history information is not obtained by the second reader 2820, the controller 2840 directs the writer 2850 to write the image read information to the data storage unit 3210 of the book 3200.

Further, if the determination unit 2830 determines that the user information obtained by the second reader 2820 is consistent with the user information acquired by the writer 2850, the controller 2840 directs the first reader 2810 to read the image data from the book 3200. Note that the controller 2840 need not be integral with the image forming apparatus 2800; a usual PC (Personal Computer) may be used as the controller 2840 in connection with the image forming apparatus 2800.

Next, the operation of the image forming apparatus 2800 of the present embodiment is explained below.

Figure 29:
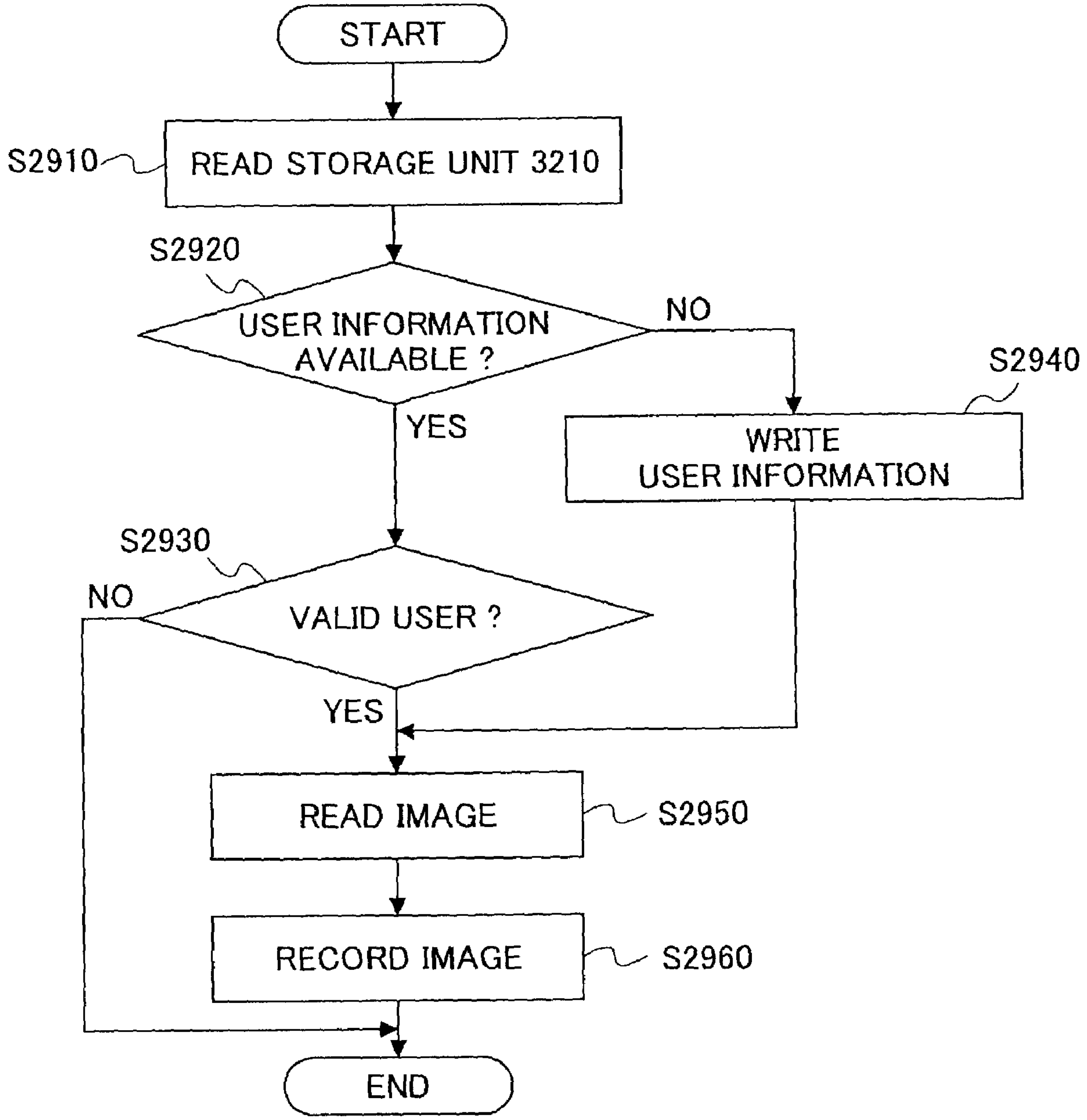
FIG. 29 is a flow chart showing the operation of the image forming apparatus of the 11th embodiment of the present invention.

FIG. 29 is a flow chart showing the operation of the image forming apparatus 2800 of the present embodiment.

In step S2910, the second reader 2820 reads control data from the data storage unit 3210 in the book 3200. For example, the control data includes read history information, that is, information of users who have read the images of the book 3200 so far.

In step S2920, the determination unit 2830 determines if the read history information is obtained by the second reader 2620, in other words, the determination unit 2830 determines if the user information is included in the read history information obtained by the second reader 2820. If the determination unit 2830 confirms that the user information is obtained by the second reader 2620, the routine proceeds to step S2930, whereas if the determination unit 2830 confirms that the user information is not obtained by the second reader 2820, the routine proceeds to step S2940.

In step S2930, the determination unit 2830 determines if the user information obtained by the second reader 2820 is consistent with the user information acquired by the writer 2850. If the determination unit 2830 determines that the user information obtained by the second reader 2820 is consistent with the user information acquired by the writer 2850, the routine proceeds to step S2950, while if the determination unit 2830 determines that the user information obtained by the second reader 2820 is not consistent with the user information acquired by the writer 2850, the routine ends.

In step S2940, the controller 2840 directs the writer 2850 to write the acquired image read information to the data storage unit 3210 of the book 3200.

In step S2950, the controller 2840 directs the first reader 2810 to read the image data from the book 3200.

In step S2960, the controller 2840 directs the recorder 2860 to record the image data obtained by the first reader 2810 to the destination recording medium.

According to the image forming apparatus 2800 of the present embodiment, while the images of the book 3200 can be digitized, if the read history information is not included in the data storage unit 3210, it is possible to write user information to the data storage unit 3210. As a result, when the digitized images are misused, it is possible to uniquely identify a user who committed the misuse, thereby enabling pursuit of the misuse.

12th Embodiment

Figure 30:
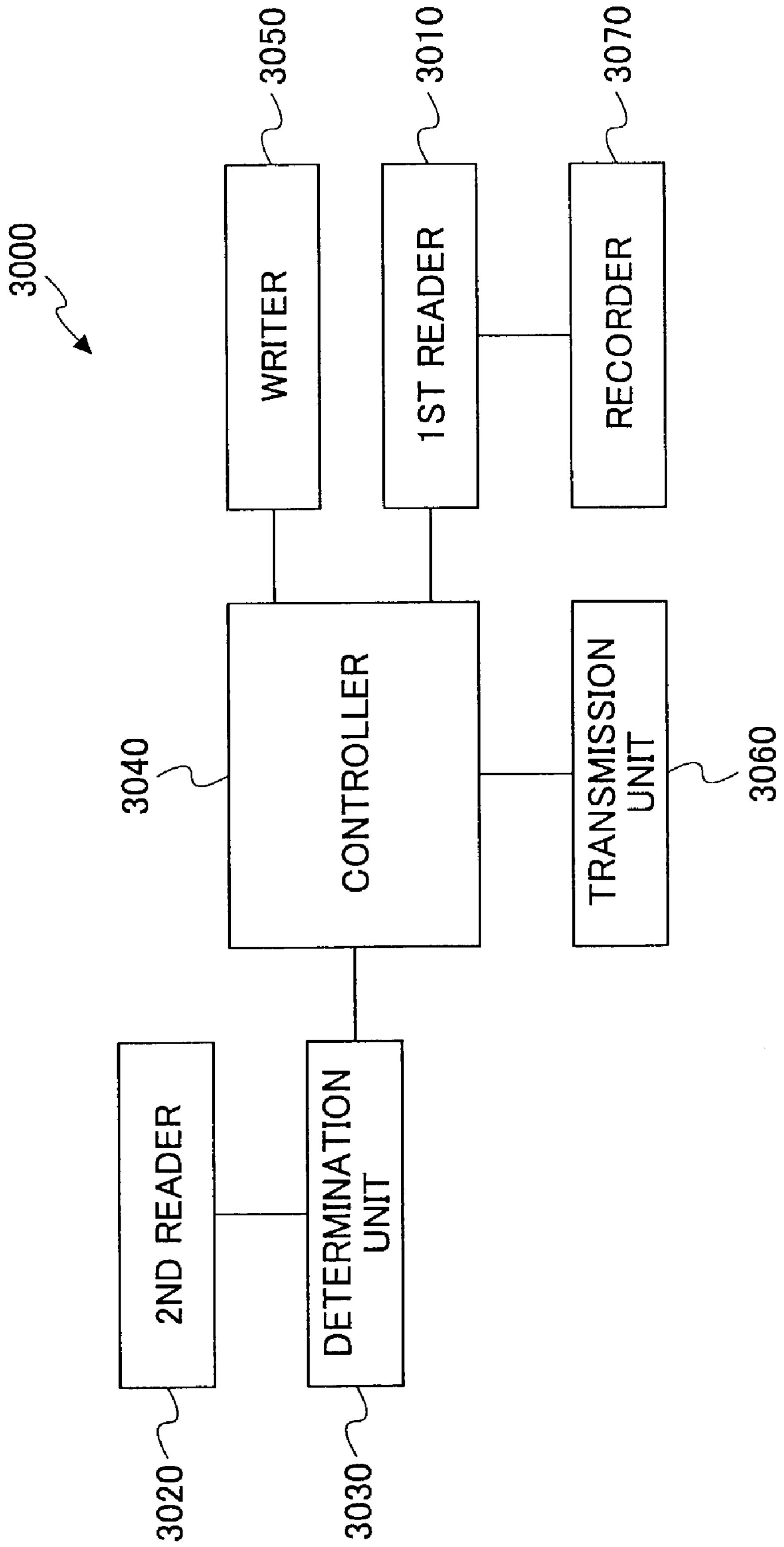
FIG. 30 is a block diagram of the configuration of an image forming apparatus according to a 12th embodiment of the present invention.

FIG. 30 is a block diagram of the configuration of an image forming apparatus 3000 according to the 12th embodiment of the present invention.

The image forming apparatus 3000 includes a first reader 3010, a second reader 3020, a determination unit 3030, a controller 3040, a writer 3050, a transmission unit 3060, and a recorder 3070.

The first reader 3010, for example, is a scanner, and reads image data from the book 3200.

The second reader 3020 reads copyright information of the book 3200 stored beforehand in the data storage unit 3210 in the book 3200. For example, copyright information includes data indicating if the book 3200 is a copyrighted work, that is, if the book 3200 is protected by copyright, and if it is, data indicating if the copyright is in effect, that is, if it is in the protected period of the copyright.

The writer 3050 acquires information of reading images in the book 3200 (image read information), and writes the acquired image read information to the data storage unit 3210 of the book 3200. Here, for example, the image read information is information of a device that is to read images of the book 3200. Specifically, the image read information may be the MAC ((Media Access Address)) of a PC (Personal Computer) that controls the device. Additionally, the image read information may further include user data, date and time, and locations.

The transmission unit 3060 is connected to a not-illustrated communication line, thus is able to communicate with peripheral devices. The transmission unit 3060 transmits the copyright data obtained by the first reader 3010 and the image read information obtained by the writer 3050 to a specified website of a peripheral device.

The determination unit 3030 determines if the reading (or recording) of images of the book 3200 is permitted based on the copyright information of the book 3200 obtained by the second reader 3020. In other words, the determination unit 3030 determines if the book 3200 is a copyrighted work based on the copyright information. If the determination unit 3030 determines that the book 3200 is a copyrighted work, then the determination unit 3030 determines if the copyright is in effect, that is, if it is in the protected period of the copyright. If the determination unit 3030 determines that it is in the protected period of the copyright, reading or recording of the book 3200 is not permitted.

Further, the determination unit 3030 determines if the book 3200 has a data storage unit 3210.

In addition, the determination unit 3030 confirms if communication between the transmission unit 3060 and the peripheral devices is possible. For example, the determination unit 3030 confirms the connection condition between them using PING or other methods. Here, the "PING" is a standard tool (command) included in an OS (Operation System) of a computer system to confirm the connection condition between the computer and a host through a network; when the PING command is executed, IP packets are delivered to the host, and it is confirmed if the packets are correctly transmitted to the host and a correct reply is received by the computer.

The recorder 3070 records the image data obtained by the first reader 3010 to a destination recording medium. The destination recording medium, for example, is paper of a book.

The controller 3040 includes a CPU (Central Processing Unit), and controls the writer 3050 and the recorder 3070 according to the determination made by the determination unit 3030.

If the determination unit 3030 determines that the copyright of the book 3200 is in effect, and communication between the transmission unit 3060 and the peripheral devices is possible, the controller 3040 directs the transmission unit 3060 to transmit the copyright information obtained by the second reader 3020 and the image read information acquired by the writer 3050 to the peripheral devices.

If the determination unit 3030 determines that the copyright of the book 3200 is in effect, but communication between the transmission unit 3060 and the peripheral devices is not possible, the controller 3040 directs the writer 3050 to write the image read information, for example, device information acquired by the writer 3050 to the data storage unit 3210.

If the determination unit 3030 determines that the copyright of the book 3200 is not in effect, the controller 3040 directs the first reader 3010 to read the images of the book 3200, or the controller 3040 directs the recorder 3070 to record the images of the book 3200 to a destination medium.

If the determination unit 3030 determines that the book 3200 does not has a data storage unit 3210, the controller 3040 directs the first reader 3010 to read the images of the book 3200, or the controller 3040 directs the recorder 3070 to record the images of the book 3200 to a destination medium.

Note that the controller 3040 need not be integral with the image forming apparatus 3000; a usual PC (Personal Computer) may be used as the controller 3040 in connection with the image forming apparatus 3000.

Next, the operation of the image forming apparatus 3000 of the present embodiment is explained below.

Figure 31:
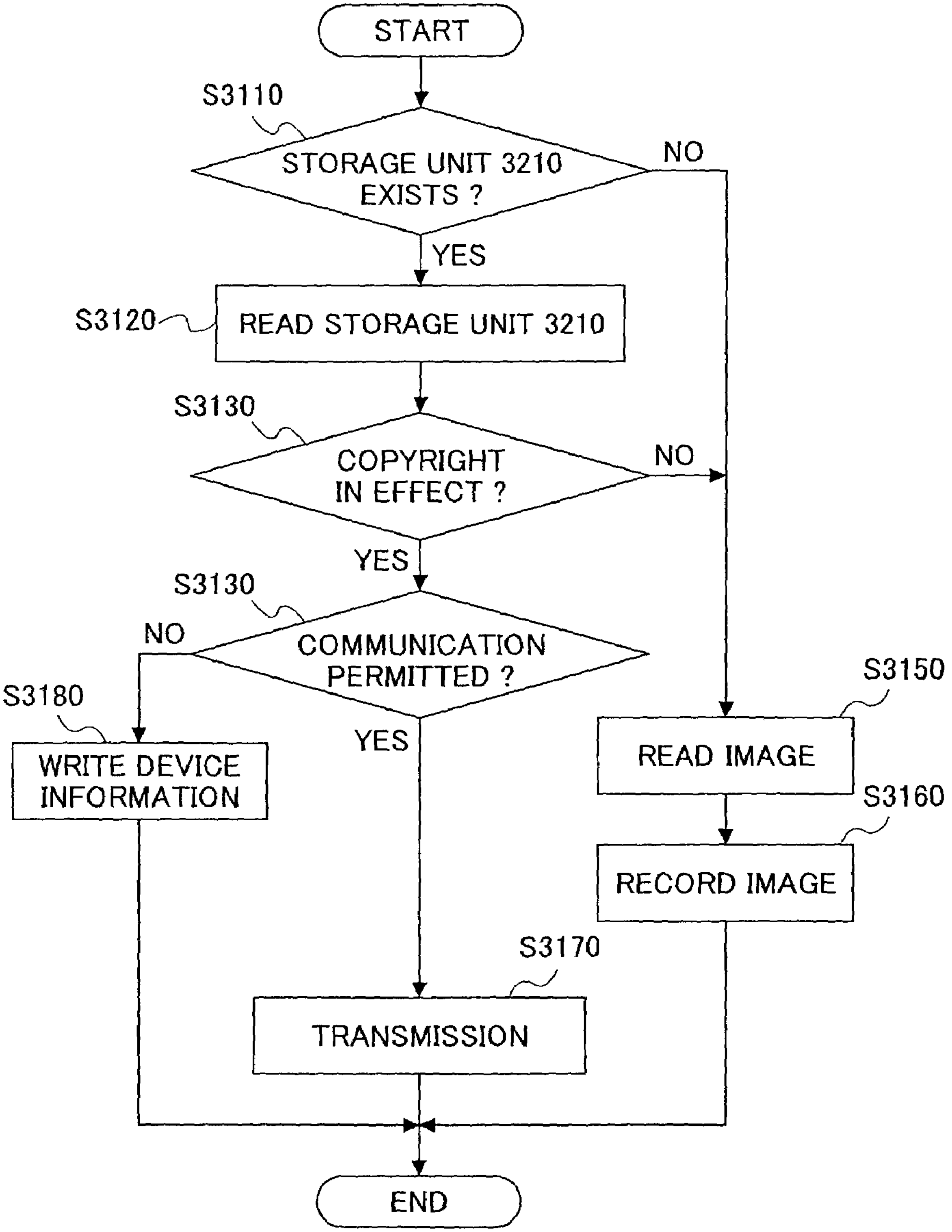
FIG. 31 is a flow chart showing the operation of the image forming apparatus of the 12th embodiment of the present invention.

FIG. 31 is a flow chart showing the operation of the image forming apparatus 3000 of the present embodiment.

In step S3110, the determination unit 3030 determines if the book 3200 has a data storage unit 3210. If the data storage unit 3210 exists, the routine proceeds to step S3120, whereas if the data storage unit 3210 does not exist, the routine proceeds to step S3150.

In step S3120, the second reader 3020 reads the copyright data from the data storage unit 3210 in the book 3200.

In step S3130, if the determination unit 3030 determines that the book 3200 is a copyrighted work within the protected period of the copyright, that is, the copyright of the book 3200 is in effect, the routine proceeds to step S3140.

If the determination unit 3030 determines that the book 3200 is not a copyrighted work, or is a copyrighted work beyond the protected period, so the copyright of the book 3200 is not in effect, the routine proceeds to step S3150.

In step S3140, if the determination unit 3030 determines that communication between the transmission unit 3060 and the peripheral devices is possible, the routine proceeds to step S3170, whereas if the determination unit 3030 determines that communication between the transmission unit 3060 and the peripheral devices is not possible, the routine proceeds to step S3180.

In step S3150, the controller 3040 directs the first reader 3010 to read the image data from the book 3200.

In step S3160, the controller 3040 directs the recorder 3060 to record the image data obtained by the first reader 3010 to the destination recording medium.

In step S3170, the controller 3040 directs the transmission unit 3060 to transmit the copyright information and the image read information to the peripheral devices.

In step S3180, the controller 3040 directs the writer 3050 to write the image read information to the data storage unit 3210 of the book 3200.

Note that in the image forming apparatus 3000 of the present embodiment, the step of S3150 may be performed at any time after the start of the routine before the step of S3130, and in this case, before the determination unit 3030 determines whether the copyright of the book 3200 is in effect, the controller 3040 may direct the first reader 3010 to read the images of the book 3200 in advance, and may control the recorder 3070 based on the copyright data.

According to the image forming apparatus 3000 of the present embodiment, it is possible to restrict illegal reading or copying of images of the book 3200 Further, in case communication with the peripheral devices cannot be made due to disconnection of the network, since it is possible to write device information to the data storage unit 3210 attached to the book 3200, when the book 3200 is read or copied someday by a device that is able to communicate with the peripheral devices, it is possible to send the device information written in the data storage unit 3210 to a specified website to report the information of the device that committed illegal reading or copying. In addition, if the image forming apparatus 3000 is able to communicate with the peripheral devices, it is possible to send the copyright information and device information to the specified website so as to report the information of the device that committed illegal reading or copying.

In addition, programs can be created to execute the operations of the image forming devices described in the ninth through 12th embodiments, and therefore, the operations of the devices of the above embodiments can be controlled by computers based on the programs.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, according to the present invention, when the first reading unit reads the image printed on the data recording medium, based on the determination made by the determination unit, it is possible to control read operations of the first reading unit, thereby preventing forgery of the data recording medium.

Further, if the determination unit determines that reading of the image is not permitted, read operations of the first reading unit can be stopped, preventing forgery of the data recording medium.

Further, by making the second reading unit movable, it is not necessary to require the second reading unit to cover the entire range of the data recording medium, and therefore it is possible to read the control data with a lesser number of the second reading units, resulting in lower cost. Further, it is also possible to reduce the amount of electromagnetic waves, and hence reduce adverse influences on the human body.

Further, since it is possible to control the operations of the recording unit and the writing unit based on the determination made by the determination unit, forgery of the data recording medium is preventable.

In addition, when recording of the image is not permitted, if the recording unit tries to record the image to another medium (a so-called target medium), a warning message or other data different from the image is recorded to the target medium, and therefore, forgery of the data recording medium is preventable.

Further, when recording of the image is not permitted, user identification information can be written on the data storage unit of the source data recording medium or on the target medium. This information can be used as evidence of using the data recording medium, allowing prevention of forgery of the data recording medium, and a later follow-up survey as well.

In addition, date and time, device information, position information of the device, and user information related to read operations of the image can be written on the data storage unit, and this enables a later follow-up survey and prevention of forgery of the data recording medium as well.

Further, since communication with other devices is enabled, it is possible to report to others when forgery is found.

Further, based on the number of times of read operations already performed and the limit to the number of times of read operations, it is possible to restrict the number of times of read operations, and to prevent illegal copying.

Further, since it is possible to write device information to the data storage unit when necessary, when misuse of images occurs, it is possible to uniquely identify the device that committed the illegal act, thereby enabling pursuit of the device.

In addition, when image reading is not permitted, it is possible to control the first reading unit not to read, thus restricting illegal reading or copying.

Further, it is possible to send copyright information or device information to a specified website of a peripheral device so as to report the information of the device that committed illegal reading or copying.

This patent application is based on Japanese priority patent application No. 2002-182850 filed on Jun. 24, 2002, No. 2002-232513 filed on Aug. 9, 2002, No. 2002-274659 filed on Sep. 20, 2002, and No. 2003-050305 filed on Feb. 27, 2003, the entire contents of which are hereby incorporated by reference.

What is claimed is:

1. A reading device for reading a data recording medium including a sheet portion visibly printed with an image and a data storage unit recorded with control data, comprising:

a first reading unit adapted to optically read the image on the sheet portion;

a second reading unit adapted to read the control data including reading permission data indicating whether reading of the image is permitted, the second reading unit reading the control data prior to or at the same time as the first reading unit reading the image on the sheet portion;

a determination unit adapted to determine whether reading of the image by the first reading unit is permitted based on the reading permission data obtained by the second reading unit prior to or at the same time as said first reading unit reading the image on the sheet portion; and a controller adapted to control the first reading unit based on the determination by the determination unit; and a moving unit for moving the first and second reading units simultaneously, wherein the controller directs the first reading unit to stop reading the image when the determination unit determines that reading of the image is not permitted;

the controller directs the first reading unit to read the image when the determination unit determines that reading of the image is permitted; and wherein the second reading unit is mounted integrally to the first reading unit; and the first reading unit reads the image from the data recording medium while the second reading unit reads the control data from the data recording medium.

2. The reading device of claim 1, further comprising:

a transmission unit adapted to transmit the control data to a device outside, wherein the controller is adapted to control the transmission unit and the first reading unit, said controller directing the transmission unit to transmit the control data to the device outside when the predetermined data are included in the control data, said controller directing the first reading unit to stop reading the image when the device outside determines that reading of the image is not permitted, and directing the first reading unit to read the image when the device outside determines that reading of the image is permitted.

3. The reading device of claim 1, further comprising:

a reading information acquiring unit adapted to acquire reading condition data of operation of reading the image;

a writing unit adapted to write the reading condition data acquired by the reading information acquiring unit to the data storage unit;

a first determination unit adapted to determine whether predetermined data are included in the control data obtained by the second reading unit;

a transmission unit adapted to transmit the control data and the reading condition data to a device outside; and a second determination unit adapted to determine whether transmission of the control data and the reading condition data is allowed, the controller adapted to control the transmission unit, the writing unit, and the first reading unit, wherein the controller directs the transmission unit to transmit the control data and the reading condition data to the device outside when the second determination unit determines that transmission of the control data and the reading condition data is allowed, and the controller directs the first reading unit to stop reading the image when the device outside determines that reading of the image is not permitted, and directs the first reading unit to read the image when the device outside determines that reading of the image is permitted;

the controller directs the writing unit to write the reading condition data to the data storage unit when the second determination unit determines that transmission of the control data and the reading condition data is not allowed.

4. The reading device of claim 1, further comprising:

a transmission unit adapted to transmit the control data to a device outside, wherein the controller is adapted to control the transmission unit and the first reading unit, said controller directing the transmission unit to transmit the control data to the device outside when the predetermined data are included in the control data, said controller directing the first reading unit to stop reading the image when the device outside determines that reading of the image is not permitted, and directing the first reading unit to read the image when the device outside determines that reading of the image is permitted.

5. The reading device of claim 1, further comprising:

a reading information acquiring unit adapted to acquire reading condition data of operation of reading the image;

a writing unit adapted to write the reading condition data acquired by the reading information acquiring unit to the data storage unit;

a first determination unit adapted to determine whether predetermined data are included in the control data obtained by the second reading unit;

a transmission unit adapted to transmit the control data and the reading condition data to a device outside; and a second determination unit adapted to determine whether transmission of the control data and the reading condition data is allowed, the controller adapted to control the transmission unit, the writing unit, and the first reading unit, wherein the controller directs the transmission unit to transmit the control data and the reading condition data to the device outside when the second determination unit determines that transmission of the control data and the reading condition data is allowed, and the controller directs the first reading unit to stop reading the image when the device outside determines that reading of the image is not permitted, and directs the first reading unit to read the image when the device outside determines that reading of the image is permitted; and the controller directs the writing unit to write the reading condition data to the data storage unit when the second determination unit determines that transmission of the control data and the reading condition data is not allowed.

6. The reading device of claim 1, wherein the second reading unit is adapted to read the control data including first reading condition data indicating a number of times of reading operations already performed with the book and second reading condition data indicating a limiting number of times of reading operations with the book, said control data being read prior to or at the same time as said image on the page;

the determination unit is adapted to determine whether the first reading condition data are greater than the second reading condition data;

the controller directs the first reading unit to read the image when the determination unit determines that the first reading condition data are not greater than the second reading condition data; and the controller directs the first reading unit not to read the image when the determination unit determines that the first reading condition data are greater than the second reading condition data.

7. The reading device of claim 1, further comprising:

a writing unit adapted to write the reading condition data to the data storage unit, wherein the controller directs the first reading unit to read the image when the determination unit determines that the reading condition data are included in the control data; and the controller directs the first reading unit not to read the image and directs the writing unit to write the reading condition data to the data storage unit when the determination unit determines that the reading condition data are not included in the control data.

8. The reading device of claim 1, further comprising:

a transmission unit adapted to transmit the copyright data to a device outside, wherein the determination unit is adapted to determine whether reading the image from the book is permitted based on the copyright data; and wherein the controller directs the first reading unit to read the image when the determination unit determines that reading the image from the book is permitted, and directs the first reading unit not to read the image when the determination unit determines that reading the image from the book is not permitted, and the controller directs the transmission unit to transmit the copyright data to the device outside when the determination unit determines that reading the image from the book is not permitted.

9. The reading device of claim 1, further comprising:

a recording unit adapted to record the image obtained by the first reading unit to the target medium, wherein the controller directs the first reading unit to read the image and directs the recording unit to record the image to the target medium when the determination unit determines that reading the image from the book is permitted; and the controller directs the first reading unit not to read the image and directs the recording unit not to record the image to the target medium when the determination unit determines that reading the image from the book is not permitted.

10. The reading device of claim 9, wherein the controller directs the first reading unit to read the image and directs the recording unit to record the image to the target medium when the determination unit determines that the copyright of the book is not in a protection period; and the controller directs the first reading unit not to read the image and the recording unit not to record the image to the target medium when the determination unit determines that the copyright of the book is within the protection period.

* * * * *